United States Patent
Raghavan et al.

(12) 
(10) Patent No.: US 6,729,994 B1
(45) Date of Patent: May 4, 2004

(54) MULTI-SPEED TRANSMISSION MECHANISMS WITH THREE PLANETARY GEARSETS AND CLUTCH INPUT

(75) Inventors: Madhusudan Raghavan, West Bloomfield, MI (US); Patrick Benedict Usoro, Troy, MI (US); Norman Kenneth Bucknor, Troy, MI (US); Chunhao J. Lee, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/282,931

(22) Filed: Oct. 29, 2002

(51) Int. Cl.[7] .............................. F16H 3/44; F16H 3/62; F16H 37/06
(52) U.S. Cl. ..................... 475/296; 475/330; 475/276; 475/280
(58) Field of Search ................. 475/296, 271, 475/275–280, 282, 284, 286, 288, 290, 293, 311, 313, 317, 319, 323, 325, 330

(56) References Cited

U.S. PATENT DOCUMENTS

| | | | |
|---|---|---|---|
| 4,070,927 A | 1/1978 | Polak | 74/765 |
| 4,660,439 A * | 4/1987 | Hiraiwa | 475/276 |
| 4,709,594 A | 12/1987 | Maeda | 74/753 |
| 5,098,357 A * | 3/1992 | Asada et al. | 475/278 |
| 5,106,352 A | 4/1992 | Lepelletier | 475/280 |
| 5,599,251 A | 2/1997 | Beim et al. | 475/275 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,217,474 B1 | 4/2001 | Ross et al. | 475/269 |
| 6,620,075 B2 * | 9/2003 | Kao et al. | 475/275 |

FOREIGN PATENT DOCUMENTS

JP 9-126283 5/1997

* cited by examiner

*Primary Examiner*—Tisha D Lewis
(74) *Attorney, Agent, or Firm*—Kathryn A. Marra

(57) ABSTRACT

A family of power transmissions wherein each family member includes first, second, and third planetary gearsets, six torque-transmitting mechanisms, and one continuous interconnecting member. The interconnecting member interconnects a member of the first planetary gearset, a member of the second planetary gearset, and a member of the third planetary gearset. The torque-transmitting mechanisms being selectively engageable in combinations of four to establish at least seven forward speed ratios and one reverse speed ratio within the planetary gearset.

4 Claims, 8 Drawing Sheets

| | RATIOS | 50 | 52 | 54 | 56 | 58 | 60 |
|---|---|---|---|---|---|---|---|
| REVERSE | -4.22 | X | | | X | X | X |
| NEUTRAL | 0 | X | | | X | | X |
| 1 | 2.56 | X | | X | X | | X |
| 2 | 1.32 | X | | X | X | X | |
| 3 | 1.00 | X | X | X | X | | |
| 4 | 0.80 | | X | X | X | X | |
| 5 | 0.71 | X | X | X | | X | |
| 6 | 0.61 | | X | X | | X | X |
| 7 | 0.49 | X | X | X | | | X |

( X=engaged )

Ring Gear/Sun Gear Tooth Ratios: $\frac{R1}{S1}=1.74, \frac{R2}{S2}=1.53, \frac{R3}{S3}=1.54$

| Ratio Spread | 5.23 |
|---|---|
| Ratio Steps | |
| REV/1 | -1.65 |
| 1/2 | 1.94 |
| 2/3 | 1.32 |
| 3/4 | 1.26 |
| 4/5 | 1.12 |
| 5/6 | 1.17 |
| 6/7 | 1.24 |

| | RATIOS | 150 | 152 | 154 | 156 | 158 | 160 |
|---|---|---|---|---|---|---|---|
| REVERSE | -1.81 | X | | | X | X | X |
| NEUTRAL | 0 | X | | | X | | X |
| 1 | 2.69 | X | | X | X | | X |
| 2 | 1.47 | X | | X | X | X | |
| 3 | 1.00 | X | X | X | X | | |
| 4 | 0.72 | | X | X | X | X | |
| 5 | 0.51 | X | X | X | | X | |
| 6 | 0.40 | | X | X | | X | X |
| 7 | 0.35 | X | X | X | | | X |

( X=engaged )

Ring Gear/Sun Gear Tooth Ratios: $\frac{R1}{S1}=1.72, \frac{R2}{S2}=2.92, \frac{R3}{S3}=1.50$

| Ratio Spread | 7.73 |
|---|---|
| Ratio Steps | |
| REV/1 | -0.67 |
| 1/2 | 1.83 |
| 2/3 | 1.47 |
| 3/4 | 1.38 |
| 4/5 | 1.41 |
| 5/6 | 1.28 |
| 6/7 | 1.15 |

| | RATIOS | 250 | 252 | 254 | 256 | 258 | 260 |
|---|---|---|---|---|---|---|---|
| REVERSE | -3.92 | X | | X | X | X | |
| NEUTRAL | 0 | X | | | X | X | |
| 1 | 4.38 | X | | | X | X | X |
| 2 | 2.39 | X | | X | X | | X |
| 3 | 1.28 | | X | X | X | | X |
| 4 | 1.00 | X | X | X | X | | |
| 5 | 0.85 | X | X | X | | | X |
| 6 | 0.72 | X | X | X | | X | |
| 7 | 0.61 | | X | X | | X | X |

(X=engaged)

Ring Gear/Sun Gear Tooth Ratios: $\frac{R1}{S1}=1.54, \frac{R2}{S2}=2.94, \frac{R3}{S3}=1.54$

| Ratio Spread | 7.22 |
|---|---|
| Ratio Steps | |
| REV/1 | -0.90 |
| 1/2 | 1.83 |
| 2/3 | 1.87 |
| 3/4 | 1.28 |
| 4/5 | 1.18 |
| 5/6 | 1.18 |
| 6/7 | 1.18 |

| | RATIOS | 350 | 352 | 354 | 356 | 358 | 360 |
|---|---|---|---|---|---|---|---|
| REVERSE | -1.38 | X | | | X | X | X |
| NEUTRAL | 0 | X | | | X | X | |
| 1 | 1.94 | X | | X | X | X | |
| 2 | 1.30 | X | | X | X | | X |
| 3 | 1.00 | X | X | X | X | | |
| 4 | 0.68 | | X | X | X | | X |
| 5 | 0.51 | X | X | X | | | X |
| 6 | 0.40 | | X | X | | X | X |
| 7 | 0.33 | X | X | X | | X | |

(X=engaged)

Ring Gear/Sun Gear Tooth Ratios: $\frac{R1}{S1}=2.94, \frac{R2}{S2}=2.24, \frac{R3}{S3}=1.52$

| Ratio Spread | 5.88 |
|---|---|
| Ratio Steps | |
| REV/1 | -0.71 |
| 1/2 | 1.49 |
| 2/3 | 1.30 |
| 3/4 | 1.47 |
| 4/5 | 1.34 |
| 5/6 | 1.28 |
| 6/7 | 1.20 |

| | RATIOS | 450 | 452 | 454 | 456 | 458 | 460 |
|---|---|---|---|---|---|---|---|
| REVERSE | -.422 | | X | X | | X | X |
| NEUTRAL | 0 | | X | X | | | X |
| 1 | 2.56 | | X | X | X | X | |
| 2 | 1.32 | | X | X | X | | X |
| 3 | 1.00 | X | X | X | X | | |
| 4 | 0.80 | X | | X | X | | X |
| 5 | 0.71 | X | X | | X | | X |
| 6 | 0.61 | X | | | X | X | X |
| 7 | 0.49 | X | X | | X | X | |

(X=engaged)

Ring Gear/Sun Gear Tooth Ratios: $\frac{R1}{S1}=1.54, \frac{R2}{S2}=2.53, \frac{R3}{S3}=1.74$

| Ratio Spread | 5.23 |
|---|---|
| Ratio Steps | |
| REV/1 | -1.65 |
| 1/2 | 1.94 |
| 2/3 | 1.32 |
| 3/4 | 1.26 |
| 4/5 | 1.12 |
| 5/6 | 1.17 |
| 6/7 | 1.24 |

|  | RATIOS | 550 | 552 | 554 | 556 | 558 | 560 |
|---|---|---|---|---|---|---|---|
| REVERSE | -1.89 |  | X | X |  | X | X |
| NEUTRAL | 0 |  | X | X |  | X |  |
| 1 | 2.47 |  | X | X | X | X |  |
| 2 | 1.55 |  | X | X | X |  | X |
| 3 | 1.00 | X | X | X | X |  |  |
| 4 | 0.63 | X |  | X | X |  | X |
| 5 | 0.42 | X | X |  | X |  | X |
| 6 | 0.35 | X |  |  | X | X | X |
| 7 | 0.30 | X | X |  | X | X |  |

( X=engaged )

Ring Gear/Sun Gear Tooth Ratios: $\frac{R1}{S1}=1.89, \frac{R2}{S2}=3.22, \frac{R3}{S3}=2.56$

| Ratio Spread | 8.14 |
|---|---|
| Ratio Steps |  |
| REV/1 | -0.76 |
| 1/2 | 1.60 |
| 2/3 | 1.55 |
| 3/4 | 1.59 |
| 4/5 | 1.49 |
| 5/6 | 1.22 |
| 5/6 | 1.14 |

| | RATIOS | 650 | 652 | 654 | 656 | 658 | 660 |
|---|---|---|---|---|---|---|---|
| REVERSE | -3.92 | X | | X | X | X | |
| NEUTRAL | 0 | X | | | X | X | |
| 1 | 4.38 | X | | | X | X | X |
| 2 | 2.39 | X | | X | X | | X |
| 3 | 1.28 | | X | X | X | | X |
| 4 | 1.00 | X | X | X | X | | |
| 5 | 0.85 | X | X | X | | | X |
| 6 | 0.72 | X | X | X | | X | |
| 7 | 0.61 | | X | X | | X | X |

(X=engaged)

Ring Gear/Sun Gear Tooth Ratios: $\frac{R1}{S1}=2.54, \frac{R2}{S2}=1.54, \frac{R3}{S3}=2.94$

| Ratio Spread | 7.22 |
|---|---|
| Ratio Steps | |
| REV/1 | -0.90 |
| 1/2 | 1.83 |
| 2/3 | 1.87 |
| 3/4 | 1.28 |
| 4/5 | 1.18 |
| 5/6 | 1.18 |
| 5/6 | 1.18 |

| | RATIOS | 750 | 752 | 754 | 756 | 758 | 760 |
|---|---|---|---|---|---|---|---|
| REVERSE | -1.38 | | X | X | | X | X |
| NEUTRAL | 0 | | X | X | | | X |
| 1 | 1.94 | | X | X | X | | X |
| 2 | 1.30 | | X | X | X | X | |
| 3 | 1.00 | X | X | X | X | | |
| 4 | 0.68 | X | X | X | | X | |
| 5 | 0.51 | X | X | | X | X | |
| 6 | 0.40 | X | | | X | X | X |
| 7 | 0.33 | X | X | | | X | X |

(X=engaged)

Ring Gear/Sun Gear Tooth Ratios: $\frac{R1}{S1}=2.52, \frac{R2}{S2}=2.24, \frac{R3}{S3}=2.94$

| Ratio Spread | 5.88 |
|---|---|
| Ratio Steps | |
| REV/1 | -0.71 |
| 1/2 | 1.49 |
| 2/3 | 1.30 |
| 3/4 | 1.47 |
| 4/5 | 1.34 |
| 5/6 | 1.28 |
| 5/6 | 1.20 |

MULTI-SPEED TRANSMISSION MECHANISMS WITH THREE PLANETARY GEARSETS AND CLUTCH INPUT

TECHNICAL FIELD

This invention relates to multi-speed planetary transmissions and, more particularly, to multi-speed planetary transmissions having three planetary gearsets and six torque-transmitting mechanisms to provide at least seven forward speed ratios and one reverse speed ratio.

BACKGROUND OF THE INVENTION

Automatic shifting power transmissions are currently used in a majority of the vehicles produced in the United States. These vehicles generally employ three- and four-speed power transmissions. More recently, a trend towards more ratios, such as five- and six-speed power transmissions, has been proposed. In fact, some manufacturers do provide five-speed transmissions. Many of the vehicles utilizing manual type transmissions or countershaft type transmissions employ five- and six-speed power transmissions.

The five- and six-speed power transmissions provide improved vehicle acceleration performance and fuel economy when compared with three- and four-speed transmissions. Seven-speed transmissions offer further vehicle acceleration performance and fuel economy improvements over five- and six-speed transmissions. However, seven-speed power transmissions have not been proposed due to the complexity of these assemblies, as well as size and cost. There are many current patents that describe five- and six-speed power transmissions. Some of the six-speed power transmission patents, especially those assigned to the assignee of the present invention, describe six-speed power transmissions in families, wherein one or more family members incorporate a seven-speed power transmission.

SUMMARY OF THE INVENTION

It is an object of this invention to provide an improved family of transmissions providing at least seven forward speeds and one reverse speed.

In one aspect of the present invention, each family member has three planetary gearsets and each planetary gearset has three members comprised of a sun gear member, a ring gear member, and a planet carrier assembly member.

In another aspect of the present invention, each family member includes an interconnecting member connecting a first member of the first planetary gearset with a first member of the second planetary gearset, and with a first member of the third planetary gearset.

In yet another aspect of the present invention, each family member includes a transmission output shaft, which is continuously connected with at least one member of one of the planetary gearsets.

In yet still another aspect of the present invention, each family member includes an input shaft that is not continuously connected with any of the planetary gearsets but rather interconnected therewith through selectively engageable torque-transmitting mechanisms.

In still another aspect of the present invention, each family member includes six selectively engageable torque-transmitting mechanisms that are engaged in combinations of four to provide at least seven forward speed ratios and one reverse speed ratio in the planetary gearsets.

In a further aspect of the present invention, a first of the torque-transmitting mechanisms selectively interconnects the input shaft with a member of one of the planetary gearsets.

In a yet further aspect of the present invention, a second torque-transmitting mechanism selectively interconnects the input shaft with another member of one of the planetary gearsets.

In a still further aspect of the present invention, a third of the torque-transmitting mechanisms selectively interconnects at least one member of one of the planetary gearsets with another member of one of the planetary gearsets.

In a yet still further aspect of the present invention, a fourth of the torque-transmitting mechanisms selectively interconnects a member of the second or third planetary gearset with another member of one of the planetary gearsets.

In a further aspect of the present invention, a fifth of the torque-transmitting mechanisms selectively interconnects at least one member of one of the planetary gearsets with a transmission housing.

In another aspect of the present invention, a sixth of the torque-transmitting mechanisms selectively interconnects a transmission housing with another member of one of the planetary gearsets.

DESCRIPTION OF THE EXEMPLARY EMBODIMENTS

Figures 1, 2:
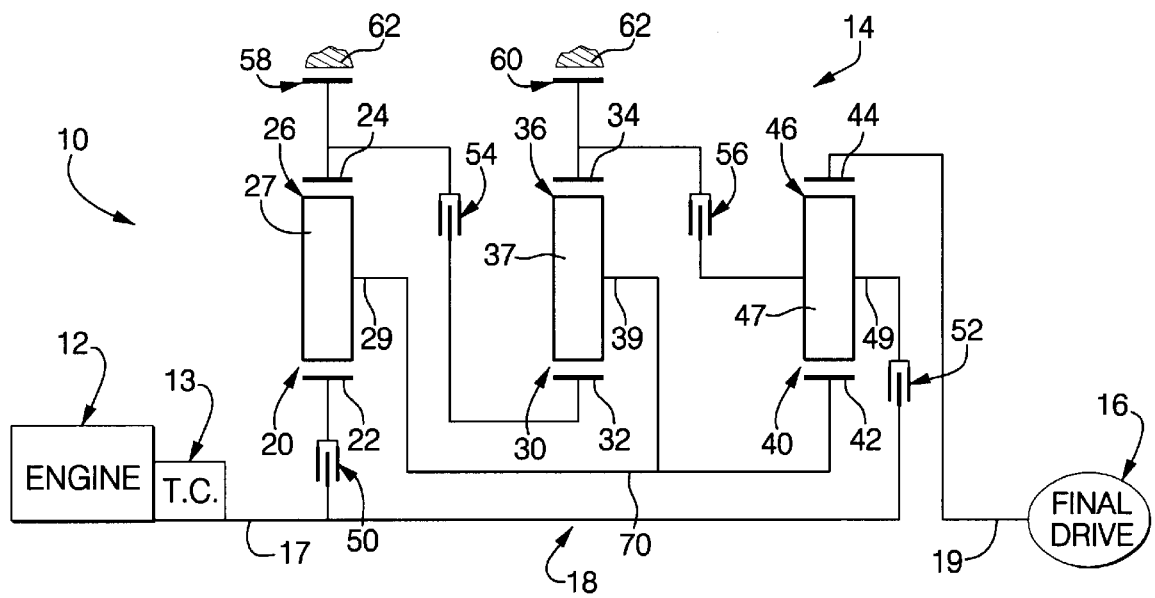
FIG. 1 is a schematic representation of a powertrain including one family member, which incorporates the present invention.
FIG. 2 is a truth table and chart depicting some of the operating parameters of the family member shown in FIG. 1.

Referring to the drawings, wherein like characters represent the same or corresponding parts throughout the several views, there is seen in FIG. 1 a powertrain 10 having a conventional engine 12, a conventional starting device 13, a planetary transmission 14, and a conventional final drive mechanism 16. The final drive mechanism 16 is connected in a well known manner to the drive wheels of a vehicle, not shown.

The planetary transmission 14 includes an input shaft 17, which is continuously connected with the engine 12 through the starting device 13, a planetary gear arrangement 18, and an output shaft 19, which is continuously connected with the final drive mechanism 16.

The planetary gear arrangement 18 includes a first planetary gearset 20 having a sun gear member 22, a ring gear member 24, and a planet carrier assembly member 26. The planet carrier assembly member 26 includes a plurality of pinion gears 27 rotatably mounted on a planet carrier member 29 and disposed in meshing relationship with the sun gear member 22 and the ring gear member 24.

The planetary gear arrangement 18 also includes a second planetary gearset 30, which includes a sun gear member 32, a ring gear member 34, and a planet carrier assembly member 36. The planet carrier assembly member 36 includes a plurality of pinion gears 37 rotatably mounted on a planet carrier member 39 and disposed in meshing relationship with the sun gear member 32 and the ring gear member 34.

The planetary gear arrangement 18 further includes a third planetary gearset 40, which includes a sun gear member 42, a ring gear member 44, and a planet carrier assembly member 46. The planet carrier assembly member 46 includes a plurality of pinion gears 47 rotatably mounted on a planet carrier member 49 and disposed in meshing relationship with the sun gear member 42 and the ring gear member 44.

Each of the planetary gearsets 20, 30, and 40 are single type planetary gearsets. In this type of planetary gearset, a plurality of single pinion members are disposed in meshing relationship between the sun gear member and the ring gear member of the planetary gearset. The pinion gear members are rotatably mounted on a planet carrier in equiangular positions so as to distribute the torque loads transmitted through the planetary gearset.

The planetary gear arrangement 18 also includes six torque transmitting mechanisms 50, 52, 54, 56, 58, and 60. The torque-transmitting mechanisms 50, 52, 54, and 56 are of the rotating type torque-transmitting mechanisms, commonly termed clutches. They are conventional fluid-operated friction devices that include a plurality of friction discs, which are engaged by a fluid-operated piston. The torque-transmitting mechanisms 58 and 60 are conventional stationary type torque-transmitting mechanisms, commonly termed brakes. These mechanisms can be either of the multiple disc type or of the band type brake assembly. The construction and operation of both types of torque-transmitting mechanisms are well known to those skilled in the art.

The planet carrier assembly member 26, the planet carrier assembly member 36, and the sun gear member 42 are continuously interconnected by an interconnecting member 70. The output shaft 19 is continuously interconnected with the ring gear member 44.

The input shaft 17 is selectively connectible with the sun gear member 22 through the torque-transmitting mechanism 50 and selectively connectible with the planet carrier assembly member 46 through the torque-transmitting mechanism 52. The sun gear member 32 and ring gear member 24 are selectively interconnectible through the torque-transmitting mechanism 54. The planet carrier assembly member 46 and ring gear member 34 are selectively interconnectible through the torque-transmitting mechanism 56. The ring gear member 24 is selectively connectible with a transmission housing 62 through the torque-transmitting mechanism 58. The ring gear member 34 is selectively connectible with the transmission housing 62 through the torque-transmitting mechanism 60.

As seen in the truth table of FIG. 2, the six torque-transmitting mechanisms are selectively engageable in combinations of four to thereby establish seven forward speed ratios and one reverse speed ratio through the planetary gear arrangement 18 between the input shaft 17 and the output shaft 19. Also shown in FIG. 2 is a numerical example of speed ratios that are available in the planetary gear arrangement 18 when the ring gear/sun gear tooth ratios of the planetary gearsets 20, 30, and 40 are as shown in FIG. 2 as R1/S1, R2/S2, and R3/S3, respectively. A chart in FIG. 2 provides numerical values for the ratio steps between adjacent forward speed ratios as well as between the reverse and first forward speed ratio. The chart also contains the numerical value for the overall ratio spread for the forward speed ratios. These ratio step numbers and the ratio spread number are developed from the speed ratio numbers given in the truth table.

The reverse speed ratio is established with the engagement of the torque-transmitting mechanisms 50, 56, 58, and 60. During the reverse speed ratio, the planet carrier assembly member 26 and sun gear member 42 are rotated at a speed determined by the speed of the sun gear member 22 and the ring gear/sun gear tooth ratio of the planetary gearset 20. The ring gear member 44 and therefore output shaft 19 are rotated at a speed determined by the speed of the sun gear member 42 and the ring gear/sun gear tooth ratio of the planetary gearset 40. The numerical value of the reverse speed ratio is determined by the ring gear/sun gear tooth ratios of the planetary gearsets 20 and 40.

The first forward speed ratio is established with the engagement of the torque-transmitting mechanisms 50, 54, 56, and 60. During the first forward speed ratio, the ring gear member 24 and sun gear member 32 are rotated at a speed determined by the speed of the sun gear member 22, the speed of the planet carrier assembly member 26, and the ring gear/sun gear tooth ratio of the planetary gearset 20. The planet carrier assembly member 36, sun gear member 42, and planet carrier assembly member 26 are rotated at a speed determined by the speed of the sun gear member 32 and the ring gear/sun gear tooth ratio of the planetary gearset 30. The ring gear member 44 and therefore output shaft 19 are rotated at a speed determined by the speed of the sun gear member 42 and the ring gear/sun gear tooth ratio of the planetary gearset 40. The numerical value of the first forward speed ratio is determined by the ring gear/sun gear tooth ratios of all three planetary gearsets 20, 30, and 40.

The second forward speed ratio is established with the engagement of the torque-transmitting mechanisms 50, 54, 56, and 58. During the second forward speed ratio, the planet carrier assembly member 26, sun gear member 42, and planet carrier assembly member 36 are rotated at a speed determined by the speed of the sun gear member 22 and the ring gear/sun gear tooth ratio of the planetary gearset 20. The ring gear member 34 and planet carrier assembly member 46 are rotated at a speed determined by the speed of the planet carrier assembly member 36 and the ring gear/sun gear tooth ratio of the planetary gearset 30. The ring gear member 44 and therefore output shaft 19 are rotated at a speed determined by the speed of the sun gear member 42, the speed of the planet carrier assembly member 46, and the ring gear/sun gear tooth ratio of the planetary gearset 40. The numerical value of the second forward speed ratio is determined by the ring gear/sun gear tooth ratios of all three planetary gearsets 20, 30, and 40.

The third forward speed ratio is established with the engagement of the torque-transmitting mechanisms 50, 52, 54, and 56. During the third forward speed ratio, the planetary gearsets are rotated in unison with the input shaft 17 and the output shaft 19. The numerical value of the third forward speed ratio is therefore one.

The fourth forward speed ratio is established with the engagement of the torque-transmitting mechanisms 52, 54, 56, and 58. During the fourth forward speed ratio, the planet carrier assembly member 36 and sun gear member 42 are rotated at a speed determined by the speed of the ring gear member 34 and the ring gear/sun gear tooth ratio of the planetary gearset 30. The ring gear member 44 and therefore output shaft 19 are rotated at a speed determined by the speed of the planet carrier assembly member 46, the speed of the sun gear member 42, and the ring gear/sun gear tooth ratio of the planetary gearset 40. The numerical value of the fourth forward speed ratio is determined by the ring gear/sun gear tooth ratios of the planetary gearsets 30 and 40.

The fifth forward speed ratio is established with the engagement of the torque-transmitting mechanisms 50, 52, 54, and 58. During the fifth forward speed ratio, the planet carrier assembly member 26 and sun gear member 42 are rotated at a speed determined by the speed of sun gear member 22 and the ring gear/sun gear tooth ratio of the planetary gearset 20. The ring gear member 44 and therefore output shaft 19 are rotated at a speed determined by the speed of the planet carrier assembly member 46, the speed of the sun gear member 42, and the ring gear/sun gear tooth ratio of the planetary gearset 40. The numerical value of the fifth forward speed ratio is determined by the ring gear/sun gear tooth ratios of the planetary gearsets 20 and 40.

The sixth forward speed ratio is established with the engagement of the torque-transmitting mechanisms 52, 54, 58, and 60. During the sixth forward speed ratio, the sun gear member 42 is held stationary with the engagement of the torque-transmitting mechanisms 54, 58, and 60. The ring gear member 44 is rotated at a speed determined by the speed of the planet carrier assembly member 46 and the ring gear/sun gear tooth ratio of the planetary gearset 40. The numerical value of the sixth forward speed ratio is determined by the ring gear/sun gear tooth ratio of the planetary gearset 40.

The seventh forward speed ratio is established with the engagement of the torque-transmitting mechanisms 50, 52, 54, and 60. During the seventh forward speed ratio, the ring gear member 24 and sun gear member 32 are rotated at a speed determined by the speed of the sun gear member 22, the speed of the planet carrier assembly member 26, and the ring gear/sun gear tooth ratio of the planetary gearset 20. The planet carrier assembly member 36, sun gear member 42, and planet carrier assembly member 26 are rotated at a speed determined by the speed of the sun gear member 32 and the ring gear/sun gear tooth ratio of the planetary gearset 30. The ring gear member 44 and therefore output shaft 19 are rotated at a speed determined by the speed of the planet carrier assembly member 46, the speed of the sun gear member 42, and the ring gear/sun gear tooth ratio of the planetary gearset 40. The numerical value of the seventh forward speed ratio is determined by the ring gear/sun gear tooth ratios of all three planetary gearsets 20, 30, and 40.

Those skilled in the art will recognize from the truth table that each of the forward ratio single step interchanges are of the single transition variety as is the reverse-to-forward speed interchange. A single transition interchange is defined in the art as the swapping of one torque-transmitting mechanism for another torque-transmitting mechanism. For example, on the first-to-second interchange, the torque-transmitting mechanisms 58 and 60 are swapped. During the reverse-to-forward interchange, the torque-transmitting mechanisms 58 and 54 are swapped, while the torque-transmitting mechanisms 50, 56, and 60 remain engaged through a neutral condition.

Figures 3, 4:
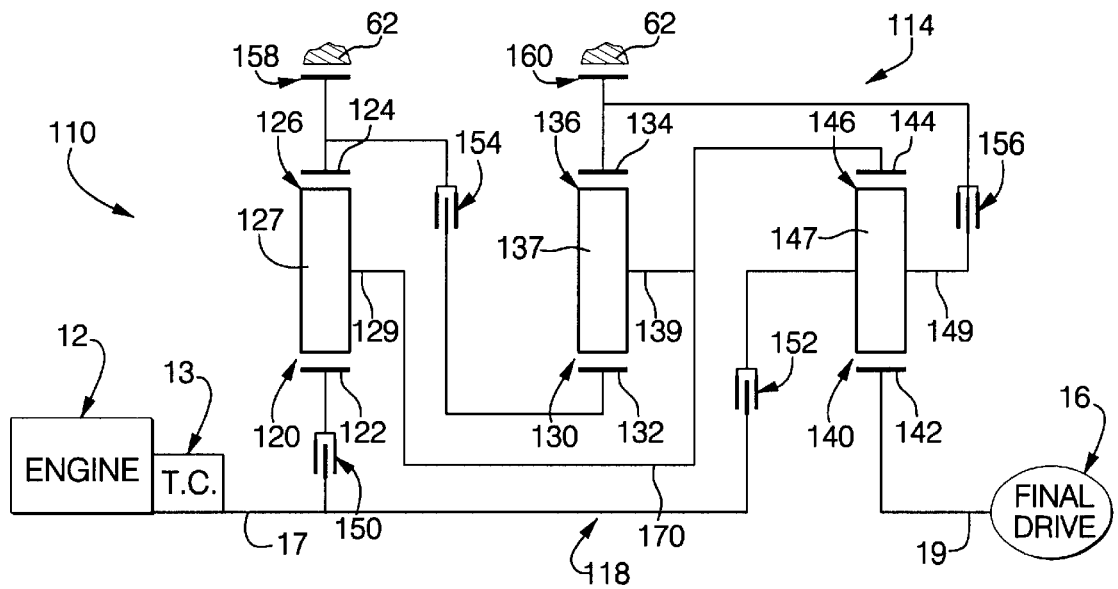
FIG. 3 is a schematic representation of powertrain incorporating another family member of the present invention.
FIG. 4 is a truth table and chart depicting some of the operating parameters of the family member shown in FIG. 3.

A powertrain 110, shown in FIG. 3, includes the engine 12, the starting device 13, a planetary transmission 114, and the final drive mechanism 16. The planetary transmission 114 includes the input shaft 17, a planetary gear arrangement 118, and the output shaft 19. The planetary gear arrangement 118 includes three planetary gearsets 120, 130, and 140, and six torque-transmitting mechanisms 150, 152, 154, 156, 158, and 160. The torque-transmitting mechanisms 158 and 160 are of the stationary type torque-transmitting mechanisms, while the remaining torque-transmitting mechanisms are of the rotating type torque-transmitting mechanisms.

The planetary gearset 120 includes a sun gear member 122, a ring gear member 124, and a planet carrier assembly member 126. The planet carrier assembly member 126 includes a plurality of pinion gears 127 rotatably mounted on a planet carrier member 129 and disposed in meshing relationship with the sun gear member 122 and the ring gear member 124.

The planetary gearset 130 includes a sun gear member 132, a ring gear member 134, and a planet carrier assembly member 136. The planet carrier assembly member 136 includes a plurality of pinion gears 137 rotatably mounted on a planet carrier member 139 and disposed in meshing relationship with the sun gear member 132 and the ring gear member 134.

The planetary gearset 140 includes a sun gear member 142, a ring gear member 144, and a planet carrier assembly member 146. The planet carrier assembly member 146 includes a plurality of pinion gears 147 rotatably mounted on a planet carrier member 149 and disposed in meshing relationship with the sun gear member 142 and the ring gear member 144.

The planet carrier member 129 of the planet carrier assembly member 126 is continuously interconnected with the planet carrier member 139 of the planet carrier assembly member 136 and the ring gear member 144 through an interconnecting member 170. The output shaft 19 is continuously interconnected with the sun gear member 142.

The input shaft 17 is selectively interconnectible with the sun gear member 122 through the torque-transmitting mechanism 150 and selectively connectible with the planet carrier member 149 of the planet carrier assembly member 146 through the torque-transmitting mechanism 152. The sun gear member 132 is selectively interconnectible with ring gear member 124 through the torque-transmitting mechanism 154. The planet carrier member 149 of the planet carrier assembly member 146 is selectively interconnectible with the ring gear member 134 through the torque-transmitting mechanism 156. The ring gear member 124 is selectively interconnectible with the transmission housing 62 through the torque-transmitting mechanism 158. The ring gear member 134 is selectively interconnectible with the transmission housing 62 through the torque-transmitting mechanism 160.

As seen in the truth table of FIG. 4, the torque-transmitting mechanisms 150, 152, 154, 156, 158, and 160 are engaged in combinations of four to provide seven forward speed ratios and one reverse speed ratio in the planetary gear arrangement 118 between the input shaft 17 and the output shaft 19. It will be recognized from the combinations of engagements and sequence of engagements of the torque-transmitting mechanisms that each of the forward single step interchanges is of the single transition variety as is the reverse-to-first forward speed ratio. The truth table also provides a numerical example of the speed ratios that are obtainable with the planetary gear arrangement 118 when the ring gear/sun gear tooth ratios of the planetary gearsets 120, 130, and 140 are selected as R1/S1, R2/S2, and R3/S3, respectively. A chart in FIG. 4 provides the numerical value for the ratio steps between adjacent forward speed ratios as well as between the reverse and first forward speed ratio. Also given in the chart is the numerical value for the overall ratio spread for the forward speed ratios.

The reverse speed ratio is established with the engagement of the torque-transmitting mechanisms 150, 156, 158, and 160. During the reverse speed ratio, the planet carrier assembly member 126 and ring gear member 144 are rotated at a speed determined by the speed of the sun gear member 122 and the ring gear/sun gear tooth ratio of the planetary gearset 120. The sun gear member 142 and therefore output shaft 19 are rotated at a speed determined by the speed of the ring gear member 144 and the ring gear/sun gear tooth ratio of the planetary gearset 140. The numerical value of the reverse speed ratio is determined by the ring gear/sun gear tooth ratios of the planetary gearsets 120 and 140.

The first forward speed ratio is established with the engagement of the torque-transmitting mechanisms 150, 154, 156, and 160. During the first forward speed ratio, the ring gear member 124 and sun gear member 132 are rotated at a speed determined by the speed of the sun gear member 122, the speed of the planet carrier assembly member 126, and the ring gear/sun gear tooth ratio of the planetary gearset 120. The planet carrier assembly member 136, planet carrier assembly member 126, and the ring gear member 144 are rotated at a speed determined by the speed of the sun gear member 132 and the ring gear/sun gear tooth ratio of the planetary gearset 130. The sun gear member 142 and therefore output shaft 19 are rotated at a speed determined by the speed of the ring gear 144 and the ring gear/sun gear tooth ratio of the planetary gearset 140. The numerical value of the first forward speed ratio is determined by the ring gear/sun gear tooth ratios of all three planetary gearsets 120, 130, and 140.

The second forward speed ratio is established with the engagement of the torque-transmitting mechanisms 150, 154, 156, and 158. During the second forward speed ratio, the planet carrier assembly member 126, planet carrier assembly member 136, and the ring gear member 144 are rotated at a speed determined by the speed of the sun gear member 122 and the ring gear/sun gear tooth ratio of the planetary gearset 120. The ring gear member 134 and planet carrier assembly member 146 are rotated at a speed determined by the speed of the planet carrier assembly member 136 and the ring gear/sun gear tooth ratio of the planetary gearset 130. The sun gear member 142 and therefore output shaft 19 are rotated at a speed determined by the speed of the ring gear member 144, the speed of the planet carrier assembly member 146, and the ring gear/sun gear tooth ratio of the planetary gearset 140. The numerical value of the second forward speed ratio is determined by the ring gear/sun gear tooth ratios of all three planetary gearsets 120, 130, and 140.

The third forward speed ratio is established with the engagement of the torque-transmitting mechanisms 150, 152, 154, and 156. During the third forward speed ratio, the planetary gearsets 120, 130, and 140 are rotated in unison between the input shaft 17 and the output shaft 19. The numerical value of the third forward speed ratio is one.

The fourth forward speed ratio is established with the engagement of the torque-transmitting mechanisms 152, 154, 156, and 158. During the fourth forward speed ratio, the planet carrier assembly member 136 and ring gear member 144 are rotated at a speed determined by the speed of the ring gear member 134 and the ring gear/sun gear tooth ratio of the planetary gearset 130. The sun gear member 142 and therefore output shaft 19 are rotated at a speed determined by the speed of the planet carrier assembly member 146, the speed of the ring gear member 144, and the ring gear/sun gear tooth ratio of the planetary gearset 140. The numerical value of the fourth forward speed ratio is determined by the ring gear/sun gear tooth ratios of the planetary gearsets 130 and 140.

The fifth forward speed ratio is established with the engagement of the torque-transmitting mechanisms 150, 152, 154, and 158. During the fifth forward speed ratio, the planet carrier assembly member 126 and ring gear member 144 are rotated at a speed determined by the speed of the sun gear member 122 and the ring gear/sun gear tooth ratio of the planetary gearset 120. The sun gear member 142 and therefore output shaft 19 are rotated at a speed determined by the speed of the planet carrier assembly member 146, the speed of the ring gear member 144, and the ring gear/sun gear tooth ratio of the planetary gearset 140. The numerical value of the fifth forward speed ratio is determined by the ring gear/sun gear tooth ratios of the planetary gearsets 120 and 140.

The sixth forward speed ratio is established with the engagement of the torque-transmitting mechanisms 152, 154, 158, and 160. During the sixth forward speed ratio, the speed of the sun gear member 142 and therefore output shaft 19 are determined by the speed of the planet carrier assembly member 146 and the ring gear/sun gear tooth ratio of the planetary gearset 140. The numerical value of the sixth forward speed ratio is determined by the ring gear/sun gear tooth ratio of the planetary gearset 140.

The seventh forward speed ratio is established with the engagement of the torque-transmitting mechanisms 150, 152, 154, and 160. During the seventh forward speed ratio, the ring gear member 124 and sun gear member 132 are rotated at a speed determined by the speed of the sun gear member 122, the speed of the planet carrier assembly member 126, and the ring gear/sun gear tooth ratio of the planetary gearset 120. The planet carrier assembly member 136, planet carrier assembly member 126, and the ring gear member 144 are rotated at a speed determined by the speed of the sun gear member 132 and the ring gear/sun gear tooth ratio of the planetary gearset 130. The sun gear member 142 and therefore output shaft 19 are rotated at a speed determined by the speed of the planet carrier assembly member 146, the speed of the ring gear member 144, and the ring gear/sun gear tooth ratio of the planetary gearset 140. The numerical value of the seventh forward speed ratio is determined by the ring gear/sun gear tooth ratios of all three planetary gearsets 120, 130, and 140.

Figures 5, 6:
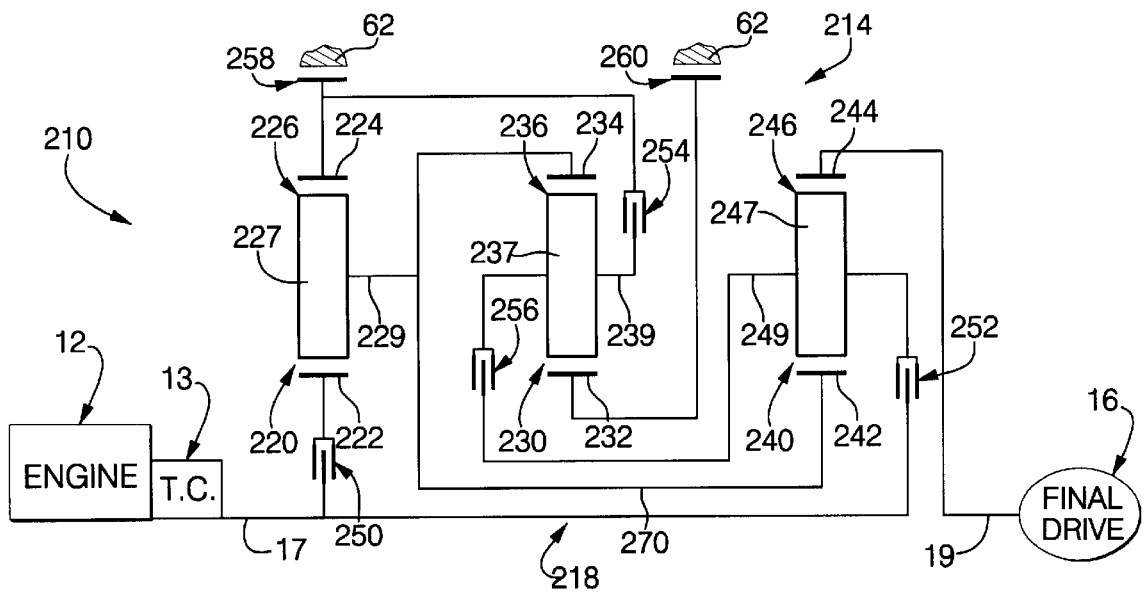
FIG. 5 is a schematic representation of a powertrain incorporating another family member of the present invention.
FIG. 6 is a truth table and chart depicting some of the operating parameters of the family member shown in FIG. 5.

A powertrain 210, shown in FIG. 5, includes the engine 12, the starting device 13, a planetary transmission 214, and the final drive mechanism 16. The planetary transmission 214 includes the input shaft 17, a planetary gear arrangement 218, and the output shaft 19. The planetary gear arrangement 218 includes three planetary gearsets 220, 230, and 240, and six torque-transmitting mechanisms 250, 252, 254, 256, 258, and 260. The torque-transmitting mechanisms 258 and 260 are stationary type torque-transmitting mechanisms, while the remaining torque-transmitting mechanisms are rotating type torque-transmitting mechanisms.

The planetary gearset 220 includes a sun gear member 222, a ring gear member 224, and a planet carrier assembly member 226. The planet carrier assembly member 226 includes a plurality of pinion gears 227 rotatably mounted on a planet carrier member 229 and disposed in meshing relationship with the sun gear member 222 and the ring gear member 224.

The planetary gearset 230 includes a sun gear member 232, a ring gear member 234, and a planet carrier assembly member 236. The planet carrier assembly member 236 includes a plurality of pinion gears 237 rotatably mounted on a planet carrier member 239 and disposed in meshing relationship with the sun gear member 232 and the ring gear member 234.

The planetary gearset 240 includes a sun gear member 242, a ring gear member 244, and a planet carrier assembly member 246. The planet carrier assembly member 246 includes a plurality of pinion gears 247 rotatably mounted on a planet carrier member 249 and disposed in meshing relationship with the sun gear member 242 and the ring gear member 244.

The planet carrier assembly member 226, ring gear member 234, and the sun gear member 242 are continuously interconnected through an interconnecting member 270. The ring gear member 244 is continuously interconnected with the output shaft 19.

The input shaft 17 is selectively connectible with the sun gear member 222 through the torque-transmitting mechanism 250, and selectively connectible with the planet carrier assembly member 246 through the torque-transmitting mechanism 252. The planet carrier assembly member 236 and ring gear member 224 are selectively interconnectible through the torque-transmitting mechanism 254. The planet carrier assembly member 236 and sun gear member 242 are selectively interconnectible through the torque-transmitting mechanism 256. The ring gear member 224 is selectively connectible with the transmission housing 62 through the torque-transmitting mechanism 258. The sun gear member 232 is selectively connectible with the transmission housing 62 through the torque-transmitting mechanism 260.

As seen in the truth table of FIG. 6, the torque-transmitting mechanisms 250, 252, 254, 256, 258, and 260 are selectively engaged in combinations of four to establish seven forward speed ratios and one reverse speed ratio within the planetary gear arrangement 218 between the input shaft 17 and the output shaft 19. The forward single step interchanges as well as the reverse-to-first interchange are all of the single transition variety. Also given in the truth table of FIG. 6 is a numerical example of the speed ratios that can be obtained in the planetary gear arrangement 218 when the ring gear/sun gear tooth ratios of the planetary gearsets 220, 230, and 240 are selected as R1/S1, R2/S2, and R3/S3, respectively. A chart in FIG. 6 gives the numerical example of the ratio steps between adjacent forward speed ratios as well as between the reverse and first forward speed ratio. Also given in the chart is the numerical value of the overall ratio spread of the forward speed ratios.

The reverse speed ratio is established with the engagement of the torque-transmitting mechanisms 250, 254, 256, and 258. During the reverse speed ratio, the planet carrier assembly member 226, ring gear member 234, and sun gear member 242 are rotated at a speed determined by the speed of the sun gear member 222 and the ring gear/sun gear tooth ratio of the planetary gearset 220. The ring gear member 244 and therefore output shaft 19 are rotated at a speed determined by the speed of the sun gear member 242 and the ring gear/sun gear tooth ratio of the planetary gearset 240. The numerical value of the reverse speed ratio is determined by the ring gear/sun gear tooth ratios of the planetary gearsets 220 and 240.

The first forward speed ratio is established with the engagement of the torque-transmitting mechanisms 250, 256, 258, and 260. During the first forward speed ratio, the planet carrier assembly member 226, ring gear member 234, and sun gear member 242 are rotated at a speed determined by the speed of the sun gear member 222 and the ring gear/sun gear tooth ratio of the planetary gearset 220. The planet carrier assembly members 236 and 246 are rotated at a speed determined by the speed of the ring gear member 234 and the ring gear/sun gear tooth ratio of the planetary gearset 230. The ring gear member 244 and therefore output shaft 19 are rotated at a speed determined by the speed of the planet carrier assembly member 246, the speed of the sun gear member 242, and the ring gear/sun gear tooth ratio of the planetary gearset 240. The numerical value of the first forward speed ratio is determined by the ring gear/sun gear tooth ratios of all three planetary gearsets 220, 230, and 240.

The second forward speed ratio is established with the engagement of the torque-transmitting mechanisms 250, 254, 256, and 260. During the second forward speed ratio, the ring gear member 224, planet carrier assembly member 236, and planet carrier assembly member 246 are rotated at a speed determined by the speed of the sun gear member 222, the speed of the planet carrier assembly member 226, and the ring gear/sun gear tooth ratio of the planetary gearset 220. The ring gear member 234, planet carrier assembly member 226, and sun gear member 242 are rotated at a speed determined by the speed of the planet carrier assembly member 236 and the ring gear/sun gear tooth ratio of the planetary gearset 230. The ring gear member 244 and therefore output shaft 19 are rotated at a speed determined by the speed of the planet carrier assembly member 246, the speed of the sun gear member 242, and the ring gear/sun gear tooth ratio of the planetary gearset 240. The numerical value of the second forward speed ratio is determined by the ring gear/sun gear tooth ratios of all three planetary gearsets 220, 230, and 240.

The third forward speed ratio is established with the engagement of the torque-transmitting mechanisms 252, 254, 256, and 260. During the third forward speed ratio, the ring gear member 234 and sun gear member 242 are rotated at a speed determined by the speed of the planet carrier assembly member 236 and the ring gear/sun gear tooth ratio of the planetary gearset 230. The ring gear member 244 and therefore output shaft 19 are rotated at a speed determined by the speed of the sun gear member 242, the speed of the planet carrier assembly member 246, and the ring gear/sun gear tooth ratio of the planetary gearset 240. The numerical value of the third forward speed ratio is determined by the ring gear/sun gear tooth ratios of the planetary gearsets 230 and 240.

The fourth forward speed ratio is established with the engagement of the torque-transmitting mechanisms 250, 252, 254, and 256. During the fourth forward speed ratio, the planetary gearsets 220, 230, and 240 are rotated in unison with the input shaft 17 and the output shaft 19. The numerical value of the fourth forward speed ratio is one.

The fifth forward speed ratio is established with the engagement of the torque-transmitting mechanisms 250, 252, 254, and 260. During the fifth forward speed ratio, the ring gear member 224 and planet carrier assembly member 236 are rotated at a speed determined by the speed of the sun gear member 222, the speed of the planet carrier assembly member 226, and the ring gear/sun gear tooth ratio of the planetary gearset 220. The ring gear member 234, planet carrier assembly member 226, and the sun gear member 242 are rotated at a speed determined by the speed of the planet carrier assembly member 236 and the ring gear/sun gear tooth ratio of the planetary gearset 230. The ring gear member 244 and therefore output shaft 19 are rotated at a speed determined by the speed of the planet carrier assembly member 246, the speed of the sun gear member 242, and the ring gear/sun gear tooth ratio of the planetary gearset 240. The numerical value of the fifth forward speed ratio is determined by the ring gear/sun gear tooth ratios of all three planetary gearsets 220, 230, and 240.

The sixth forward speed ratio is established with the engagement of the torque-transmitting mechanisms 250, 252, 254, and 258. During the sixth forward speed ratio, the planet carrier assembly member 226, ring gear member 244, and sun gear member 242 are rotated at a speed determined by the speed of the sun gear member 222 and the ring gear/sun gear tooth ratio of the planetary gearset 220. The ring gear member 244 and therefore output shaft 19 are rotated at a speed determined by the speed of the planet carrier assembly member 246, the speed of the sun gear member 242, and the ring gear/sun gear tooth ratio of the planetary gearset 240. The numerical value of the sixth forward speed ratio is determined by the ring gear/sun gear tooth ratios of the planetary gearsets 220 and 240.

The seventh forward speed ratio is established with the engagement of the torque-transmitting mechanisms 252, 254, 258, and 260. During the seventh forward speed ratio, the ring gear member 244 and therefore output shaft 19 are rotated at a speed determined by the speed of the planet carrier assembly member 246 and the ring gear/sun gear tooth ratio of the planetary gearset 240. The numerical value of the seventh forward speed ratio is determined by the ring gear/sun gear tooth ratio of the planetary gearset 240.

Figures 7, 8:
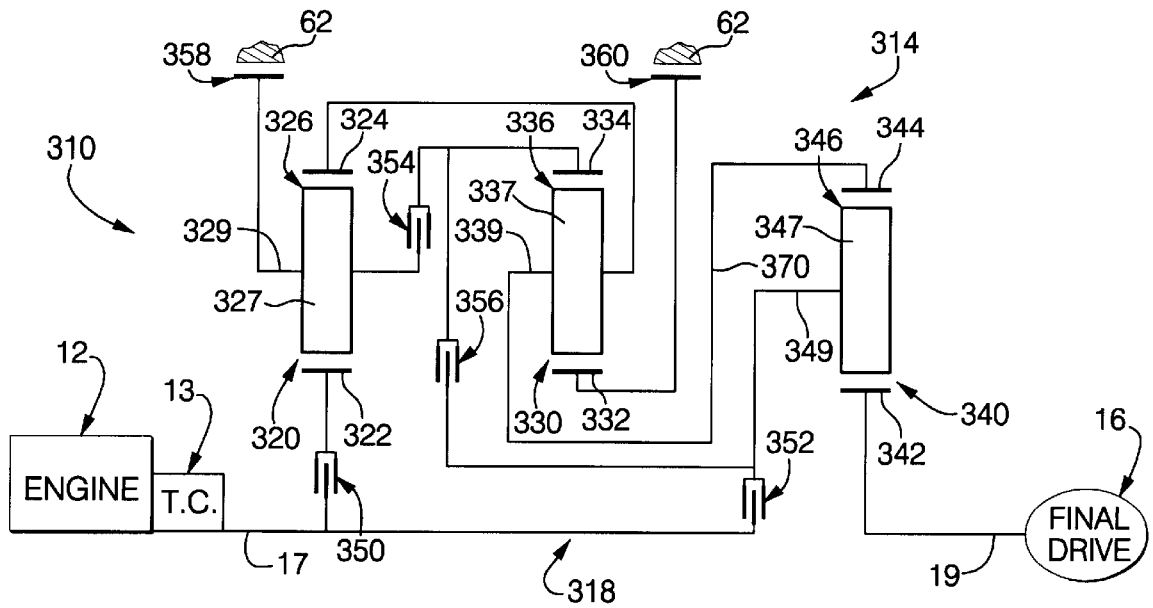
FIG. 7 is a schematic representation of a powertrain incorporating another family member of the present invention.
FIG. 8 is a truth table and chart depicting some of the operating parameters of the family member shown in FIG. 7.

A powertrain 310, shown in FIG. 7, includes the engine 12, the starting device 13, a planetary transmission 314, and the final drive mechanism 16. The planetary transmission 314 includes the input shaft 17, a planetary gear arrangement 318, and the output shaft 19. The planetary gear arrangement 318 includes three planetary gearsets 320, 330, and 340, and six torque-transmitting mechanisms 350, 352, 354, 356, 358, and 360. The torque-transmitting mechanisms 358 and 360 are stationary type torque-transmitting mechanisms, while the remaining torque-transmitting mechanisms are rotating type torque-transmitting mechanisms.

The planetary gearset 320 includes a sun gear member 322, a ring gear member 324, and a planet carrier assembly member 326. The planet carrier assembly member 326 includes a plurality of pinion gears 327 rotatably mounted on a planet carrier member 329 and disposed in meshing relationship with the sun gear member 322 and the ring gear member 324.

The planetary gearset 330 includes a sun gear member 332, a ring gear member 334, and a planet carrier assembly member 336. The planet carrier assembly member 336 includes a plurality of pinion gears 337 rotatably mounted on a planet carrier member 339 and disposed in meshing relationship with the sun gear member 332 and the ring gear member 334.

The planetary gearset 340 includes a sun gear member 342, a ring gear member 344, and a planet carrier assembly member 346. The planet carrier assembly member 346 includes a plurality of pinion gears 347 rotatably mounted on a planet carrier member 349 and disposed in meshing relationship with the sun gear member 342 and the ring gear member 344.

The ring gear member 324, planet carrier assembly member 336, and ring gear member 344 are continuously interconnected by an interconnecting member 370. The sun gear member 342 is continuously connected with the output shaft 19.

The input shaft 17 is selectively interconnectible with the sun gear member 322 through the torque-transmitting mechanism 350 and selectively connectible with the planet carrier assembly member 346 through the torque-transmitting mechanism 352. The planet carrier assembly member 326 is selectively interconnectible with the ring gear member 334 through the torque-transmitting mechanism 354 and selectively connectible with the transmission housing 62 through the torque-transmitting mechanism 358. The ring gear member 334 is selectively interconnectible with the planet carrier assembly member 346 through the torque-transmitting mechanism 356. The sun gear member 332 is selectively interconnectible with the transmission housing 62 through the torque-transmitting mechanism 360.

As shown in the truth table of FIG. 8, the torque-transmitting mechanisms 350, 352, 354, 356, 358, and 360 are selectively engaged in combinations of four to provide seven forward speed ratios and one reverse speed ratio. It is noted therein that each of the forward speed ratios single step interchanges are of the single transition variety as is the reverse-to-first forward interchange. Also given in the truth table of FIG. 8 is a numerical example of the speed ratios that are available within the planetary gear arrangement 318. These numerical examples are determined utilizing the ring gear/sun gear tooth ratios of the planetary gearsets 320, 330, and 340, which are given as R1/S1, R2/S2, and R3/S3, respectively. Also provided in FIG. 8 is a chart providing a numerical example of the ratio steps between adjacent forward speed ratios and between the reverse and first forward speed ratio. The chart of FIG. 8 also gives the numerical value for the overall ratio spread for the forward speed ratios.

The reverse speed ratio is established with the engagement of the torque-transmitting mechanisms 350, 356, 358, and 360. During the reverse speed ratio, the ring gear member 324, planet carrier assembly member 336, and ring gear member 344 are rotated at a speed determined by the speed of the sun gear member 322 and the ring gear/sun gear tooth ratio of the planetary gearset 320. The ring gear member 334 and planet carrier assembly member 346 are rotated at a speed determined by the speed of the planet carrier assembly member 336 and the ring gear/sun gear tooth ratio of the planetary gearset 330. The sun gear member 342 and therefore output shaft 19 are rotated at a speed determined by the speed of the ring gear member 344, the speed of the planet carrier assembly member 346, and the ring gear/sun gear tooth ratio of the planetary gearset 340. The numerical value of the reverse speed ratio is determined by the ring gear/sun gear tooth ratios of all three planetary gearsets 320, 330, and 340.

The first forward speed ratio is established with the engagement of the torque-transmitting mechanisms 350, 354, 356, and 358. During the first forward speed ratio, the ring gear member 324 and ring gear member 344 are rotated at a speed determined by the speed of the sun gear member 322 and the ring gear/sun gear tooth ratio of the planetary gearset 320. The sun gear member 342 and therefore output shaft 19 are rotated at a speed determined by the speed of the ring gear member 344 and the ring gear/sun gear tooth ratio of the planetary gearset 340. The numerical value of the first forward speed ratio is determined by the ring gear/sun gear tooth ratios of the planetary gearsets 320 and 340.

The second forward speed ratio is established with the engagement of the torque-transmitting mechanisms 350, 354, 356, and 360. During the second forward speed ratio, the ring gear member 324, planet carrier assembly member 336, and ring gear member 344 are rotated at a speed determined by the speed of the sun gear member 322, the speed of the planet carrier assembly member 326, and the ring gear/sun gear tooth ratio of the planetary gearset 320. The ring gear member 334, planet carrier assembly member 326, and the planet carrier assembly member 346 are rotated at a speed determined by the speed of the planet carrier assembly member 336 and the ring gear/sun gear tooth ratio of the planetary gearset 330. The sun gear member 342 and therefore output shaft 19 are rotated at a speed determined by the speed of the ring gear member 344, the speed of the planet carrier assembly member 346, and the ring gear/sun gear tooth ratio of the planetary gearset 340. The numerical value of the second forward speed ratio is determined by the ring gear/sun gear tooth ratios of all three planetary gearsets 320, 330, and 340.

The third forward speed ratio is established with the engagement of the torque-transmitting mechanisms 350, 352, 354, and 356. During the third forward speed ratio, the planetary gearset 320, 330, and 340 rotate in unison with the input shaft 17 and the output shaft 19. The numerical value of the third forward speed ratio is one.

The fourth forward speed ratio is established with the engagement of the torque-transmitting mechanisms 352, 354, 356, and 360. During the fourth forward speed ratio, the planet carrier assembly member 336 and ring gear member 344 are rotated at a speed determined by the speed of the ring gear member 334 and the ring gear/sun gear tooth ratio of the planetary gearset 330. The sun gear member 342 and therefore output shaft 19 are rotated at a speed determined by the speed of the ring gear member 344, the speed of the planet carrier assembly member 346, and the ring gear/sun gear tooth ratio of the planetary gearset 340. The numerical value of the fourth forward speed ratio is determined by the ring gear/sun gear tooth ratios of the planetary gearsets 330 and 340.

The fifth forward speed ratio is established with the engagement of the torque-transmitting mechanisms 350, 352, 354, and 360. During the fifth forward speed ratio, the planet carrier assembly member 326 and ring gear member 334 are rotated at a speed determined by the speed of the sun gear member 322, the speed of the ring gear member 324, and the ring gear/sun gear tooth ratio of the planetary gearset 320. The planet carrier assembly member 336, ring gear member 324, and ring gear member 344 are rotated at a speed determined by the speed of the ring gear member 334 and the ring gear/sun gear tooth ratio of the planetary gearset 330. The sun gear member 342 and therefore output shaft 19 are rotated at a speed determined by the speed of the planet carrier assembly member 346, the speed of the ring gear member 344, and the ring gear/sun gear tooth ratio of the planetary gearset 340. The numerical value of the fifth forward speed ratio is determined by the ring gear/sun gear tooth ratios of all three planetary gearsets 320, 330, and 340.

The sixth forward speed ratio is established with the engagement of the torque-transmitting mechanisms 352, 354, 358, and 360. During the sixth forward speed ratio, the sun gear member 342 and therefore output shaft 19 are rotated at a speed determined by the speed of the planet carrier assembly member 346 and the ring gear/sun gear tooth ratio of the planetary gearset 340. The numerical value of the sixth forward speed ratio is determined by the ring gear/sun gear tooth ratio of the planetary gearset 340.

The seventh forward speed ratio is established with the engagement of the torque-transmitting mechanisms 350, 352, 354, and 358. During the seventh forward speed ratio, the ring gear member 324, planet carrier assembly member 336, and ring gear member 344 are rotated at a speed determined by the speed of the sun gear member 322 and the ring gear/sun gear tooth ratio of the planetary gearset 320. The sun gear member 342 and therefore output shaft 19 are rotated at a speed determined by the speed of the planet carrier assembly member 346, the speed of the ring gear member 344, and the ring gear/sun gear tooth ratio of the planetary gearset 340. The numerical value of the seventh forward speed ratio is determined by the ring gear/sun gear tooth ratios of the planetary gearsets 320 and 340.

Figures 9, 10:
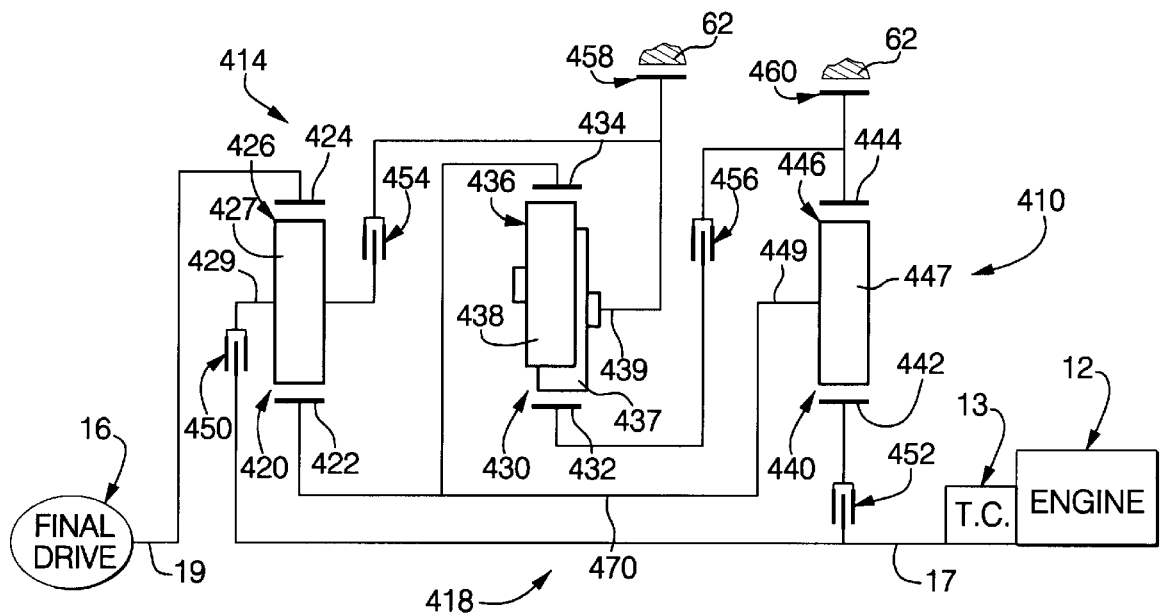
FIG. 9 is a schematic representation of a powertrain incorporating another family member of the present invention.
FIG. 10 is a truth table and chart depicting some of the operating parameters of the family member shown in FIG. 9.

A powertrain 410, shown in FIG. 9, includes the engine 12, the starting device 13, a planetary transmission 414, and the final drive mechanism 16. The planetary transmission 414 includes the input shaft 17, a planetary gear arrangement 418, and the output shaft 19. The planetary gear arrangement 418 includes three planetary gearsets 420, 430, and 440, and six torque-transmitting mechanisms 450, 452, 454, 456, 458, and 460. The torque-transmitting mechanisms 458 and 460 are of the stationary type, while the remaining torque-transmitting mechanisms are of the rotating type.

The planetary gearset 420 includes a sun gear member 422, a ring gear member 424, and a planet carrier assembly member 426. The planet carrier assembly member 426 includes a plurality of pinion gears 427 rotatably mounted on a planet carrier member 429 and disposed in meshing relationship with the sun gear member 422 and the ring gear member 424.

The planetary gearset 430 includes a sun gear member 432, a ring gear member 434, and a planet carrier assembly member 436. The planet carrier assembly member 436 includes a plurality of pairs of intermeshing pinion gears 437 and 438 that are rotatably mounted on a planet carrier member 439 and disposed in meshing relationship with the sun gear member 432 and the ring gear member 434, respectively.

The planetary gearset 440 includes a sun gear member 442, a ring gear member 444, and a planet carrier assembly member 446. The planet carrier assembly member 446 includes a plurality of pinion gears 447 rotatably mounted on a planet carrier member 449 and disposed in meshing relationship with the sun gear member 442 and the ring gear member 444.

The planetary gearset 430 is a double pinion planetary gearset the construction and function of which are well known in the art.

The sun gear member 422, ring gear member 434, and planet carrier assembly member 446 are continuously interconnected by an interconnecting member 470. The ring gear member 424 is continuously interconnected with the output shaft 19.

The input shaft 17 is selectively interconnectible with the planet carrier assembly member 426 through the torque-transmitting mechanism 450 and selectively connectible with the sun gear member 442 through the torque-transmitting mechanism 452. The planet carrier assembly member 426 and planet carrier assembly member 436 are selectively interconnectible through the torque-transmitting mechanism 454. The ring gear member 444 is selectively interconnectible with the sun gear member 432 through the torque-transmitting mechanism 456 and selectively interconnectible with the transmission housing 62 through the torque-transmitting mechanism 460. The planet carrier assembly member 436 is selectively interconnectible with the transmission housing 62 through the torque-transmitting mechanism 458.

The truth table shown in FIG. 10 describes the engagement combinations and sequence of the torque-transmitting mechanisms 450, 452, 454, 456, 458, and 460 such that seven forward speed ratios and one reverse speed ratio can be established within the planetary gear arrangement 418 between the input shaft 17 and the output shaft 19. The truth table also provides a numerical example of the seven forward speed ratios and the reverse speed ratio that can be obtained within the planetary gear arrangement 418 when the ring gear/sun gear tooth ratios of the planetary gearsets 420, 430, and 440 are chosen as R1/S1, R2/S2, and R3/S3, respectively. A chart in FIG. 10 gives the numerical values for the ratio steps between adjacent forward speed ratios as well as between the reverse and first forward speed ratio. The numerical value of the overall ratio spread of the forward speed ratios is also given in the chart.

The reverse speed ratio is established with the engagement of the torque-transmitting mechanisms 452, 454, 458, and 460. During the reverse speed ratio, the planet carrier assembly member 446 and sun gear member 422 are rotated at a speed determined by the speed of the sun gear member 442 and the ring gear/sun gear tooth ratio of the planetary gearset 440. The ring gear member 424 and therefore output shaft 19 are rotated at a speed determined by the speed of the sun gear member 422 and the ring gear/sun gear tooth ratio of the planetary gearset 420. The numerical value of the reverse speed ratio is determined by the ring gear/sun gear tooth ratios of the planetary gearsets 420 and 440.

The first forward speed ratio is established with the engagement of the torque-transmitting mechanisms 452, 454, 456, and 458. During the first forward speed ratio, the ring gear member 444 and sun gear member 432 are rotated at a speed determined by the speed of the sun gear member 442, the speed of the planet carrier assembly member 446, and ring gear/sun gear tooth ratio of the planetary gearset 440. The ring gear member 434, sun gear member 422, and planet carrier assembly member 446 are rotated at a speed determined by the speed of the sun gear member 432 and the ring gear/sun gear tooth ratio of the planetary gearset 430. The ring gear member 424 and therefore output shaft 19 are rotated at a speed determined by the speed of the sun gear member 422 and the ring gear/sun gear tooth ratio of the planetary gearset 420. The numerical value of the first forward speed ratio is determined by the ring gear/sun gear tooth ratios of all three planetary gearsets 420, 430, and 440.

The second forward speed ratio is established with the engagement of the torque-transmitting mechanisms 452, 454, 456, and 460. During the second forward speed ratio, the planet carrier assembly member 446, sun gear member 422, and ring gear member 434 are rotated at a speed determined by the speed of the sun gear member 442 and the ring gear/sun gear tooth ratio of the planetary gearset 440. The planet carrier assembly member 436 and planet carrier assembly member 426 are rotated at a speed determined by the speed of the ring gear member 434 and the ring gear/sun gear tooth ratio of the planetary gearset 430. The ring gear member 424 and therefore output shaft 19 are rotated at a speed determined by the speed of the sun gear member 422, the speed of the planet carrier assembly member 426, and the ring gear/sun gear tooth ratio of the planetary gearset 420. The numerical value of the second forward speed ratio is determined by the ring gear/sun gear tooth ratios of all three planetary gearsets 420, 430, and 440.

The third forward speed ratio is established with the engagement of the torque-transmitting mechanisms 450, 452, 454, and 456. During the third forward speed ratio, the planetary gearsets 420, 430, and 440 all rotate in unison with the input shaft 17 and the output shaft 19. The numerical value of the third forward speed ratio is one.

The fourth forward speed ratio is established with the engagement of the torque-transmitting mechanisms 450, 454, 456, and 460. During the fourth forward speed ratio, the ring gear member 434 and sun gear member 422 are rotated at a speed determined by the speed of the planet carrier assembly member 436 and the ring gear/sun gear tooth ratio of the planetary gearset 430. The ring gear member 424 and therefore output shaft 19 are rotated at a speed determined by the speed of the planet carrier assembly member 426, the speed of the sun gear member 422, and the ring gear/sun gear tooth ratio of the planetary gearset 420. The numerical value of the fourth forward speed ratio is determined by the ring gear/sun gear tooth ratios of the planetary gearsets 420 and 430.

The fifth forward speed ratio is established with the engagement of the torque-transmitting mechanisms 450, 452, 456, and 460. During the fifth forward speed ratio, the planet carrier assembly member 446 and sun gear member 422 are rotated at a speed determined by the speed of the sun gear member 442 and the ring gear/sun gear tooth ratio of the planetary gearset 440. The ring gear member 424 and therefore output shaft 19 are rotated at a speed determined by the speed of the planet carrier assembly member 426, the speed of the sun gear member 422, and the ring gear/sun gear tooth ratio of the planetary gearset 420. The numerical value of the fifth forward speed ratio is determined by the ring gear/sun gear tooth ratios of the planetary gearsets 420 and 440.

The sixth forward speed ratio is established with the engagement of the torque-transmitting mechanisms 450, 456, 458, and 460. During the sixth forward speed ratio, the sun gear member 422 is held stationary. The ring gear member 424 and therefore output shaft 19 are rotated at a speed determined by the speed of the planet carrier assembly member 426 and the ring gear/sun gear tooth ratio of the planetary gearset 420. The numerical value of the sixth forward speed ratio is determined by the ring gear/sun gear tooth ratio of the planetary gearset 420.

The seventh forward speed ratio is established with the engagement of the torque-transmitting mechanisms 450, 452, 456, and 458. During the seventh forward speed ratio, the ring gear member 444 and sun gear member 432 are rotated at a speed determined by the speed of the sun gear member 442, the speed of the planet carrier assembly member 446, and the ring gear/sun gear tooth ratio of the planetary gearset 440. The ring gear member 434, sun gear member 422, and planet carrier assembly member 446 are rotated at a speed determined by the speed of the sun gear member 432 and the ring gear/sun gear tooth ratio of the planetary gearset 430. The ring gear member 424 and therefore output shaft 19 are rotated at a speed determined by the speed of the planet carrier assembly member 426, the speed of the sun gear member 422, and the ring gear/sun gear tooth ratio of the planetary gearset 420. The numerical value of the seventh forward speed ratio is determined by the ring gear/sun gear tooth ratios of all three planetary gearsets 420, 430, and 440.

Figures 11, 12:
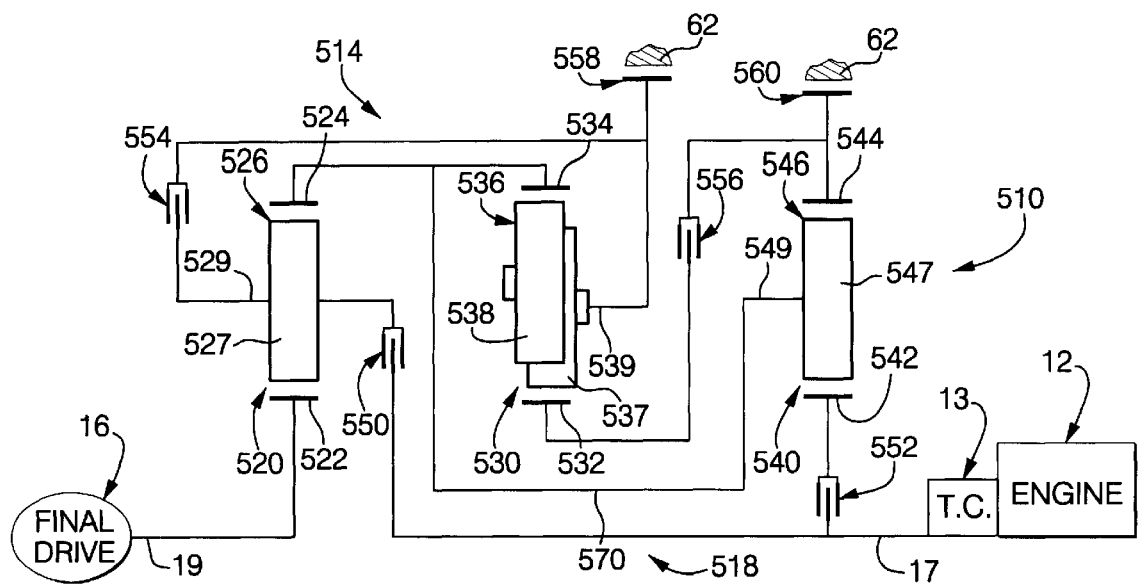
FIG. 11 is a schematic representation of a powertrain incorporating another family member of the present invention.
FIG. 12 is a truth table and chart depicting some of the operating parameters of the family member shown in FIG. 11.

A powertrain 510, shown in FIG. 11, includes the engine 12, the starting device 13, a planetary transmission 514, and the final drive mechanism 16. The planetary transmission 514 includes the input shaft 17, a planetary gear arrangement 518, and the output shaft 19. The planetary gear arrangement 518 includes three planetary gearsets 520, 530, and 540, and six torque-transmitting mechanisms 550, 552, 554, 556, 558, and 560. The torque-transmitting mechanisms 558 and 560 are of the stationary type torque-transmitting mechanisms, while the remaining torque-transmitting mechanisms are of the rotating type torque-transmitting mechanisms.

The planetary gearset 520 includes a sun gear member 522, a ring gear member 524, and a planet carrier assembly member 526. The planet carrier assembly member 526 includes a plurality of pinion gears 527 rotatably mounted on a planet carrier member 529 and disposed in meshing relationship with the sun gear member 522 and the ring gear member 524.

The planetary gearset 530 includes a sun gear member 532, a ring gear member 534, and a planet carrier assembly member 536. The planet carrier assembly member 536 includes a plurality of pairs of intermeshing pinion gears 537 and 538 rotatably mounted on a planet carrier member 539 and disposed in meshing relationship with the sun gear member 532 and the ring gear member 534, respectively.

The planetary gearset 540 includes a sun gear member 542, a ring gear member 544, and a planet carrier assembly member 546. The planet carrier assembly member 546 includes a plurality of pinion gears 547 rotatably mounted on a planet carrier member 549 and disposed in meshing relationship with the sun gear member 542 and the ring gear member 544.

The ring gear member 524, ring gear member 534, and planet carrier assembly member 546 are continuously interconnected by an interconnecting member 570. The sun gear member 522 is continuously connected with the output shaft 19.

The input shaft 17 is selectively connectible with the planet carrier assembly member 526 through the torque-transmitting mechanism 550 and selectively connectible with the sun gear member 542 through the torque-transmitting mechanism 552. The planet carrier assembly member 536 is selectively interconnectible with the planet carrier assembly member 526 through the torque-transmitting mechanism 554 and selectively interconnectible with the transmission housing 62 through the torque-transmitting mechanism 558. The ring gear member 544 is selectively interconnectible with the sun gear member 532 through the torque-transmitting mechanism 556 and selectively connectible with the transmission housing 62 through the torque-transmitting mechanism 560.

The truth table in FIG. 12 describes the engagement combinations and sequence for the torque-transmitting mechanisms 550, 552, 554, 556, 558, and 560 in order to establish seven forward speed ratios and one reverse speed ratio within the planetary gear arrangement 518 between the input shaft 17 and the output shaft 19. Also described in the truth table of FIG. 12 is an example of the numerical values for the seven forward speed ratios and the reverse speed ratio that can be obtained in the planetary gear arrangement 518 when the ring gear/sun gear tooth ratios of the planetary gearsets 520, 530, and 540 are as shown in FIG. 12 as R1/S1, R2/S2, and R3/S3, respectively. A chart in FIG. 12 gives the numerical values for the ratio steps between adjacent forward speed ratios as well as between the reverse and first forward speed ratio. Also, the numerical value of the overall ratio spread of the forward speed ratios is given in the chart.

In reviewing the truth table, it will be obvious to those skilled in the art that each of the forward single step interchanges are of the single transition variety and that the reverse-to-first interchange is also of the single transition variety.

The reverse speed ratio is established with the engagement of the torque-transmitting mechanisms 552, 554, 558, and 560. During the reverse speed ratio, the planet carrier assembly member 546 and ring gear member 524 are rotated at a speed determined by the speed of the sun gear member 542 and the ring gear/sun gear tooth ratio of the planetary gearset 540. The sun gear member 522 and therefore output shaft 19 are rotated at a speed determined by the speed of the ring gear member 524 and the ring gear/sun gear tooth ratio of the planetary gearset 520. The numerical value of the reverse speed ratio is determined by the ring gear/sun gear tooth ratios of the planetary gearsets 520 and 540.

The first forward speed ratio is established with the engagement of the torque-transmitting mechanisms 552, 554, 556, and 558. During the first forward speed ratio, the ring gear member 544 and sun gear member 532 are rotated at a speed determined by the speed of the sun gear member 542, the speed of the planet carrier assembly member 546, and the ring gear/sun gear tooth ratio of the planetary gearset 540. The ring gear member 534, ring gear member 524, and planet carrier assembly member 546 are rotated at a speed determined by the speed of the sun gear member 532 and the ring gear/sun gear tooth ratio of the planetary gearset 530. The sun gear member 522 and therefore output shaft 19 are rotated at a speed determined by the speed of the ring gear member 524 and the ring gear/sun gear tooth ratio of the planetary gearset 520. The numerical value of the first forward speed ratio is determined by the ring gear/sun gear tooth ratios of all three planetary gearsets 520, 530, and 540.

The second forward speed ratio is established with the engagement of the torque-transmitting mechanisms 552, 554, 556, and 560. During the second forward speed ratio, the planet carrier assembly member 546, ring gear member 534, and ring gear member 524 are rotated at a speed determined by the speed of the sun gear member 542 and the ring gear/sun gear tooth ratio of the planetary gearset 540.

The planet carrier assembly member 536 and planet carrier assembly member 526 are rotated at a speed determined by the speed of the ring gear member 532 and the ring gear/sun gear tooth ratio of the planetary gearset 530. The sun gear member 522 and therefore output shaft 19 are rotated at a speed determined by the speed of the ring gear member 524, the speed of the planet carrier assembly member 526, and the ring gear/sun gear tooth ratio of the planetary gearset 520. The numerical value of the second forward speed ratio is determined by the ring gear/sun gear tooth ratios of all three planetary gearsets 520, 530, and 540.

The third forward speed ratio is established with the engagement of the torque-transmitting mechanisms 550, 552, 554, and 556. During the third forward speed ratio, the planetary gearsets 520, 530, and 540 are rotated in unison with the input shaft 17 and the output shaft 19. The numerical value of the third forward speed ratio is one.

The fourth forward speed ratio is established with the engagement of the torque-transmitting mechanisms 550, 554, 556, and 560. During the fourth forward speed ratio, the ring gear members 534 and 524 are rotated at a speed determined by the speed of the planet carrier assembly member 536 and the ring gear/sun gear tooth ratio of the planetary gearset 530. The sun gear member 522 and therefore output shaft 19 are rotated at a speed determined by the speed of the ring gear member 524, the speed of the planet carrier assembly member 526, and the ring gear/sun gear tooth ratio of the planetary gearset 520. The numerical value of the fourth forward speed ratio is determined by the ring gear/sun gear tooth ratios of the planetary gearsets 520 and 530.

The fifth forward speed ratio is established with the engagement of the torque-transmitting mechanisms 550, 552, 556, and 560. During the fifth forward speed ratio, the planet carrier assembly member 546, ring gear member 534, and ring gear member 524 are rotated at a speed determined by the speed of the sun gear member 542 and the ring gear/sun gear tooth ratio of the planetary gearset 540. The sun gear member 522 and therefore output shaft 19 are rotated at a speed determined by the speed of the planet carrier assembly member 526, the speed of the ring gear member 524, and the ring gear/sun gear tooth ratio of the planetary gearset 520. The numerical value of the fifth forward speed ratio is determined by the ring gear/sun gear tooth ratios of the planetary gearsets 520 and 540.

The sixth forward speed ratio is established with the engagement of the torque-transmitting mechanisms 550, 556, 558, and 560. During the sixth forward speed ratio, the sun gear member 522 and therefore output shaft 19 are rotated at a speed determined by the speed of the planet carrier assembly member 526 and the ring gear/sun gear tooth ratio of the planetary gearset 520. The numerical value of the sixth forward speed ratio is determined by the ring gear/sun gear tooth ratio of the planetary gearset 520.

The seventh forward speed ratio is established with the engagement of the torque-transmitting mechanisms 550, 552, 556, and 558. During the seventh forward speed ratio, the ring gear member 544 and sun gear member 532 are rotated at a speed determined by the speed of the ring gear member 544, the speed of the planet carrier assembly member 546, and the ring gear/sun gear tooth ratio of the planetary gearset 540. The ring gear member 534, planet carrier assembly member 546, and ring gear member 524 are rotated at a speed determined by the speed of the sun gear member 532 and the ring gear/sun gear tooth ratio of the planetary gearset 530. The sun gear member 522 and therefore output shaft 19 are rotated at a speed determined by the speed of the planet carrier assembly member 526, the speed of the ring gear member 524, and the ring gear/sun gear tooth ratio of the planetary gearset 520. The numerical value of the seventh forward speed ratio is determined by the ring gear/sun gear tooth ratios of all three planetary gearsets 520, 530, and 540.

Figures 13, 14:
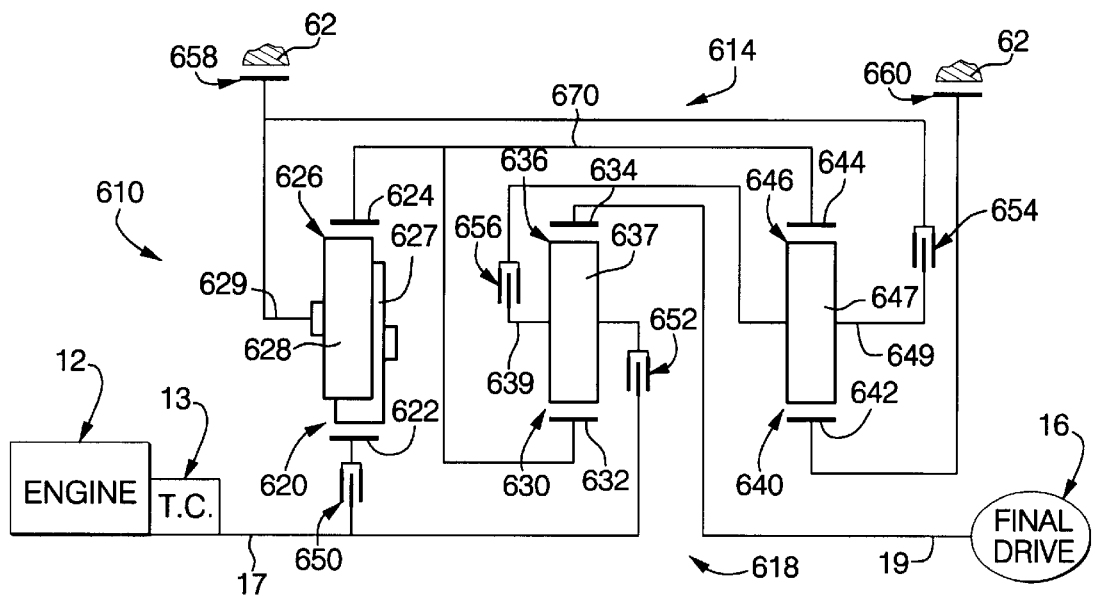
FIG. 13 is a schematic representation of a powertrain incorporating another family member of the present invention.
FIG. 14 is a truth table and chart depicting some of the operating parameters of the family member shown in FIG. 13.

A powertrain 610, shown in FIG. 13, includes the engine 12, the starting device 13, a planetary transmission 614, and the final drive mechanism 16. The planetary transmission 614 includes the input shaft 17, a planetary gear arrangement 618, and the output shaft 19. The planetary gear arrangement 618 includes three planetary gearsets 620, 630, and 640, and six torque-transmitting mechanisms 650, 652, 654, 656, 658, and 660. The torque-transmitting mechanisms 658 and 660 are of the stationary type torque-transmitting mechanisms, while the remaining torque-transmitting mechanisms are of the rotating type torque-transmitting mechanisms.

The planetary gearset 620 includes a sun gear member 622, a ring gear member 624, and a planet carrier assembly member 626. The planet carrier assembly member 626 includes a plurality of pairs of intermeshing pinion gears 627 and 628 that are rotatably mounted on a planet carrier member 629 and disposed in meshing relationship with the sun gear member 622 and the ring gear member 624, respectively.

The planetary gearset 630 includes a sun gear member 632, a ring gear member 634, and a planet carrier assembly member 636. The planet carrier assembly member 636 includes a plurality of pinion gears 637 rotatably mounted on a planet carrier member 639 and disposed in meshing relationship with the sun gear member 632 and the ring gear member 634.

The planetary gearset 640 includes a sun gear member 642, a ring gear member 644, and a planet carrier assembly member 646. The planet carrier assembly member 646 includes a plurality of pinion gears 647 rotatably mounted on a planet carrier member 649 and disposed in meshing relationship with the sun gear member 642 and the ring gear member 644.

The ring gear member 624, sun gear member 632, and ring gear member 644 are continuously interconnected by an interconnecting member 670. The output shaft 19 is continuously interconnected with the ring gear member 634.

The input shaft 17 is selectively interconnectible with the sun gear member 622 through the torque-transmitting mechanism 650 and selectively interconnectible with the planet carrier member 636 through the torque-transmitting mechanism 652. The planet carrier assembly member 646 is selectively interconnectible with the planet carrier assembly member 626 through the torque-transmitting mechanism 654 and selectively interconnectible with planet carrier assembly member 636 through the torque-transmitting mechanism 656. The planet carrier assembly member 626 is selectively interconnectible with the transmission housing 62 through the torque-transmitting mechanism 658. The sun gear member 642 is selectively interconnectible with the transmission housing 62 through the torque-transmitting mechanism 660.

The truth table of FIG. 14 describes the engagement combinations and sequence for the torque-transmitting mechanisms 650, 652, 654, 656, 658, and 660 in order to establish seven forward speed ratios and one reverse speed ratio within the planetary gear arrangement 618 between the input shaft 17 and the output shaft 19. Also given in the truth table is a numerical example of the seven forward speed ratios and the reverse speed ratio. These numerical examples are determined utilizing the ring gear/sun gear tooth ratios of the planetary gearsets 620, 630, and 640, which are given in FIG. 14 as R1/S1, R2/S2, and R3/S3, respectively. A chart in FIG. 14 gives the numerical value of the ratio steps between adjacent forward speed ratios as well as between the reverse and first forward speed ratio. The numerical value for the overall ratio spread of the forward speed ratios is also given in the chart.

The reverse speed ratio is established with the engagement of the torque-transmitting mechanisms 650, 654, 656, and 658. During the reverse speed ratio, the ring gear member 624 and sun gear member 632 are rotated at a speed determined by the speed of the sun gear member 622 and the ring gear/sun gear tooth ratio of the planetary gearset 620. The ring gear member 634 and therefore output shaft 19 are rotated at a speed determined by the speed of the sun gear member 632 and the ring gear/sun gear tooth ratio of the planetary gearset 630. The numerical value of the reverse speed ratio is determined by the ring gear/sun gear tooth ratios of the planetary gearsets 620 and 630.

The first forward speed ratio is established with the engagement of the torque-transmitting mechanisms 650, 656, 658, and 660. During the first forward speed ratio, the ring gear member 624, sun gear member 632, and ring gear member 644 are rotated at a speed determined by the speed of the sun gear member 622 and the ring gear/sun gear tooth ratio of the planetary gearset 620. The planet carrier assembly members 636 and 646 are rotated at a speed determined by the speed of the ring gear member 644 and the ring gear/sun gear tooth ratio of the planetary gearset 640. The ring gear member 634 and therefore output shaft 19 are rotated at a speed determined by the speed of the sun gear member 632, the speed of the planet carrier assembly member 636, and the ring gear/sun gear tooth ratio of the planetary gearset 630. The numerical value of the first forward speed ratio is determined by the ring gear/sun gear tooth ratios of all three planetary gearsets 620, 630, and 640.

The second forward speed ratio is established with the engagement of the torque-transmitting mechanisms 650, 654, 656, and 660. During the second forward speed ratio, the ring gear member 624, sun gear member 632, and ring gear member 644 are rotated at a speed determined by the speed of the sun gear member 622, the speed of the planet carrier assembly member 626 and the ring gear/sun gear tooth ratio of the planetary gearset 620. The planet carrier assembly member 646, planet carrier assembly member 636, and planet carrier assembly member 626 are rotated at a speed determined by the speed of the ring gear member 644 and the ring gear/sun gear tooth ratio of the planetary gearset 640. The ring gear member 632 and therefore output shaft 19 are rotated at a speed determined by the speed of the sun gear member 632, the speed of the planet carrier assembly member 636, and the ring gear/sun gear tooth ratio of the planetary gearset 630. The numerical value of the second forward speed ratio is determined by the ring gear/sun gear tooth ratios of all three planetary gearsets 620, 630, and 640.

The third forward speed ratio is established with the engagement of the torque-transmitting mechanisms 652, 654, 656, and 660. During the third forward speed ratio, the ring gear member 644 and sun gear member 632 are rotated at a speed determined by the speed of the planet carrier assembly member 646 and the ring gear/sun gear tooth ratio of the planetary gearset 640. The ring gear member 634 and therefore output shaft 19 are rotated at a speed determined by the speed of the planet carrier assembly member 636, the speed of the sun gear member 632, and the ring gear/sun gear tooth ratio of the planetary gearset 630. The numerical value of the third forward speed ratio is determined by the ring gear/sun gear tooth ratios of the planetary gearsets 630 and 640.

The fourth forward speed ratio is established with the engagement of the torque-transmitting mechanisms 650, 652, 654, and 656. During the fourth forward speed ratio, the planetary gearsets 620, 630, and 640 are rotated in unison with the input shaft 17 and the output shaft 19. The numerical value of the fourth forward speed ratio is one.

The fifth forward speed ratio is established with the engagement of the torque-transmitting mechanisms 650, 652, 654, and 660. During the fifth forward speed ratio, the planet carrier assembly members 626 and 646 are rotated at a speed determined by the speed of the sun gear member 622, the speed of the ring gear member 624, and the ring gear/sun gear tooth ratio of the planetary gearset 620. The ring gear member 644, sun gear member 632, and ring gear member 624 are rotated at a speed determined by the speed of the planet carrier assembly member 646 and the ring gear/sun gear tooth ratio of the planetary gearset 640. The ring gear member 634 and therefore output shaft 19 are rotated at a speed determined by the speed of the planet carrier assembly member 636, the speed of the sun gear member 632, and the ring gear/sun gear tooth ratio of the planetary gearset 630. The numerical value of the fifth forward speed ratio is determined by the ring gear/sun gear tooth ratios of all three planetary gearsets 620, 630, and 640.

The sixth forward speed ratio is established with the engagement of the torque-transmitting mechanisms 650, 652, 654, and 658. During the sixth forward speed ratio, the ring gear member 624 and sun gear member 632 are rotated at a speed determined by the speed of the sun gear member 622 and the ring gear/sun gear tooth ratio of the planetary gearset 620. The ring gear member 634 and therefore output shaft 19 are rotated at a speed determined by the speed of the planet carrier assembly member 636, the speed of the sun gear member 632, and the ring gear/sun gear tooth ratio of the planetary gearset 630. The numerical value of the sixth forward speed ratio is determined by the ring gear/sun gear tooth ratios of the planetary gearsets 620 and 630.

The seventh forward speed ratio is established with the engagement of the torque-transmitting mechanisms 652, 654, 658, and 660. During the seventh forward speed ratio, the ring gear member 644 and therefore output shaft 19 are rotated at a speed determined by the speed of the planet carrier assembly member 636 and the ring gear/sun gear tooth ratio of the planetary gearset 630. The numerical value of the seventh forward speed ratio is determined by the ring gear/sun gear tooth ratio of the planetary gearset 630.

Figures 15, 16:
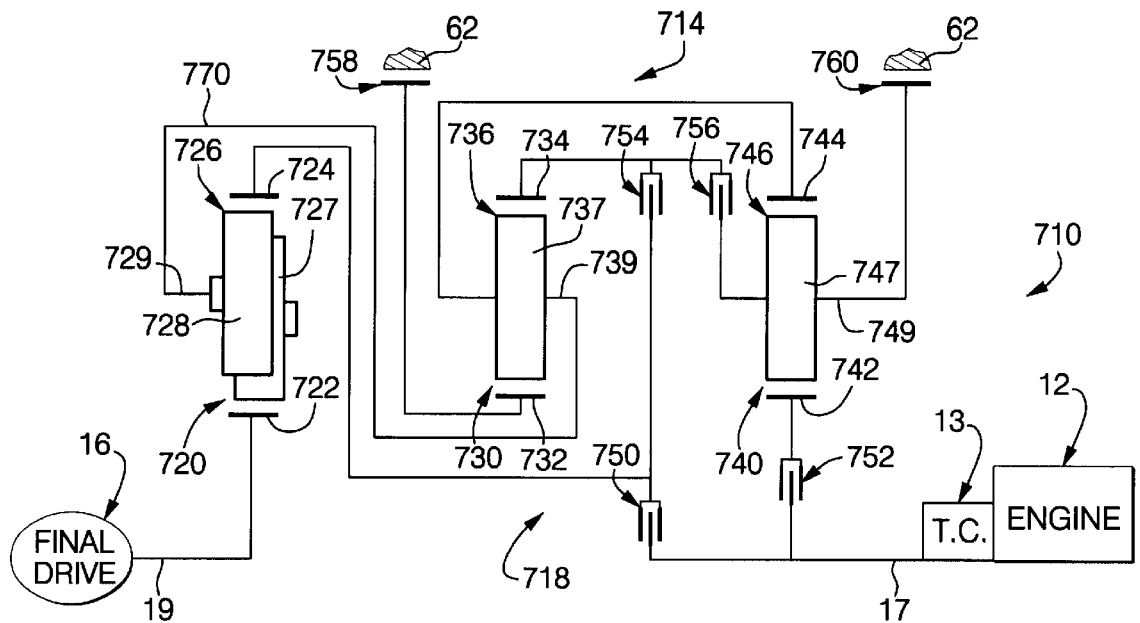
FIG. 15 is a schematic representation of a powertrain incorporating another family member of the present invention.
FIG. 16 is a truth table and chart depicting some of the operating parameters of the family member shown in FIG. 15.

A powertrain 710, shown in FIG. 15, includes the engine 12, the starting device 13, a planetary transmission 714, and the final drive mechanism 16. The planetary transmission 714 includes the input shaft 17, a planetary gear arrangement 718, and the output shaft 19. The planetary gear arrangement 718 includes three planetary gearsets 720, 730, and 740, and four rotating type torque-transmitting mechanisms 750, 752, 754, and 756, and two stationary type torque-transmitting mechanisms 758, and 760.

The planetary gearset 720 includes a sun gear member 722, a ring gear member 724, and a planet carrier assembly member 726. The planet carrier assembly member 726 includes a plurality of pairs of intermeshing pinion gears 727 and 728 that are rotatably mounted on a planet carrier member 729 and disposed in meshing relationship with the sun gear member 722 and the ring gear member 724.

The planetary gearset 730 includes a sun gear member 732, a ring gear member 734, and a planet carrier assembly member 736. The planet carrier assembly member 736 includes a plurality of pinion gears 737 rotatably mounted on a planet carrier member 739 and disposed in meshing relationship with the sun gear member 732 and the ring gear member 734.

The planetary gearset 740 includes a sun gear member 742, a ring gear member 744, and a planet carrier assembly member 746. The planet carrier assembly member 746 includes a plurality of pinion gears 747 rotatably mounted on a planet carrier member 749 and disposed in meshing relationship with the sun gear member 742 and the ring gear member 744.

The planet carrier assembly member 726, planet carrier assembly member 736, and ring gear member 744 are continuously interconnected by an interconnecting member 770. The sun gear member 722 is continuously connected with the output shaft 19.

The input shaft 17 is selectively connectible with the ring gear member 724 through the torque-transmitting mechanism 750 and selectively connectible with the sun gear member 742 through the torque-transmitting mechanism 752. The ring gear member 734 is selectively interconnectible with the ring gear member 724 through the torque-transmitting mechanism 754 and selectively interconnectible with the planet carrier assembly member 736 through the torque-transmitting mechanism 756. The sun gear member 732 is selectively interconnectible with the transmission housing 62 through the torque-transmitting mechanism 758. The planet carrier assembly member 746 is selectively interconnectible with the transmission housing 62 through the torque-transmitting mechanism 760.

The truth table in FIG. 16 describes the engagement combinations and sequence for the torque-transmitting mechanisms 750, 752, 754, 756, 758, and 760 in order to establish seven forward speed ratio and one reverse speed ratio within the planetary gear arrangement 718 between the input shaft 17 and the output shaft 19. Also given in the truth table is an example of the numerical values that can be obtained with the planetary gear arrangement 718 when the ring gear/sun gear tooth ratios of the planetary gearsets 720, 730, and 740 are given as represented in FIG. 16 as R1/S1, R2/S2, and R3/S3, respectively. Further information given in FIG. 16 by way of a chart is the numerical value for the ratio steps between adjacent forward speed ratios as well as between the reverse and first forward speed ratio. The numerical value for the overall ratio spread of the forward speed ratios is also given in the chart.

The reverse speed ratio is established with the engagement of the torque-transmitting mechanisms 752, 754, 758, and 760. During the reverse speed ratio, the ring gear member 744, planet carrier assembly member 736, and planet carrier assembly member 726 are rotated at a speed determined by the speed of the sun gear member 742 and the ring gear/sun gear tooth ratio of the planetary gearset 740. The ring gear member 734 and ring gear member 744 are rotated at a speed determined by the speed of the planet carrier assembly member 736 and the ring gear/sun gear tooth ratio of the planetary gearset 730. The sun gear member 722 and therefore output shaft 19 are rotated at a speed determined by the speed of the planet carrier assembly member 726, the speed of the ring gear member 724, and the ring gear/sun gear tooth ratio of the planetary gearset 720. The numerical value of the reverse speed ratio is determined by the ring gear/sun gear tooth ratios of all three planetary gearsets 720, 730, and 740.

The first forward speed ratio is established with the engagement of the torque-transmitting mechanisms 752, 754, 756, and 760. During the first forward speed ratio, the ring gear member 744, planet carrier assembly member 736, and planet carrier assembly member 726 are rotated at a speed determined by the speed of the sun gear member 742 and the ring gear/sun gear tooth ratio of the planetary gearset 740. The sun gear member 722 and therefore output shaft are rotated at a speed determined by the speed of the planet carrier assembly member 726 and the ring gear/sun gear tooth ratio of the planetary gearset 720. The numerical value of the first forward speed ratio is determined by the ring gear/sun gear tooth ratios of the planetary gearsets 720 and 740.

The second forward speed ratio is established with the engagement of the torque-transmitting mechanisms 752, 754, 756, and 758. During the second forward speed ratio, the planet carrier assembly member 746, ring gear member 734, and ring gear member 724 are rotated at a speed determined by the speed of the sun gear member 742, the speed of the ring gear member 744, and the ring gear/sun gear tooth ratio of the planetary gearset 740. The planet carrier assembly member 736, ring gear member 744, and planet carrier assembly member 726 are rotated at a speed determined by the speed of the ring gear member 734 and the ring gear/sun gear tooth ratio of the planetary gearset 730. The sun gear member 722 and therefore output shaft 19 are rotated at a speed determined by the speed of the ring gear member 724, the speed of the planet carrier assembly member 726, and the ring gear/sun gear tooth ratio of the planetary gearset 720. The numerical value of the second forward speed ratio is determined by the ring gear/sun gear tooth ratios of all three planetary gearsets 720, 730, and 740.

The third forward speed ratio is established with the engagement of the torque-transmitting mechanisms 750, 752, 754, and 756. During the third forward speed ratio the planetary gearsets 720, 730, and 740 rotate in unison with the input shaft 17 and the output shaft 19. The numerical value of the third forward speed ratio is one.

The fourth forward speed ratio is established with the engagement of the torque-transmitting mechanisms 750, 752, 754, and 758. During the fourth forward speed ratio, the planet carrier assembly member 736 and planet carrier assembly member 726 are rotated at a speed determined by the speed of the ring gear member 734 and the ring gear/sun gear tooth ratio of the planetary gearset 730. The sun gear member 722 and therefore output shaft 19 are rotated at a speed determined by the speed of the ring gear member 724, the speed of the planet carrier assembly member 726, and the ring gear/sun gear tooth ratio of the planetary gearset 720. The numerical value of the fourth forward speed ratio is determined by the ring gear/sun gear tooth ratio of the planetary gearsets 720 and 730.

The fifth forward speed ratio is established with the engagement of the torque transmitting mechanisms 750, 752, 756, 758. During the fifth forward speed ratio the planet carrier assembly member 746 and ring gear member 734 are rotated at a speed determined by the speed of the sun gear member 742, the speed of the ring gear member 744, and the ring gear/sun gear tooth ratio of the planetary gearset 740. The planet carrier assembly member 736, ring gear member 744, and planet carrier assembly member 726 are rotated at a speed determined by the speed of the ring gear member 734 and the ring gear/sun gear tooth ratio of the planetary gearset 730. The sun gear member 722 and therefore the output shaft 19 are rotated at a speed determined by the speed of the ring gear member 724, the speed of the planet carrier assembly member 726, and the ring gear/sun gear tooth ratio of the planetary gearset 720. The numerical value of the fifth forward speed ratio is determined by the ring gear/sun gear tooth ratios of all three planetary gearsets 720, 730, and 740.

The sixth forward speed ratio is established with the engagement of the torque-transmitting mechanisms 750, 756, 758, and 760. During the sixth forward speed ratio, the sun gear member 722 and therefore output shaft 19 are rotated at a speed determined by the speed of the ring gear member 724 and the ring gear/sun gear tooth ratio of the planetary gearset 720. The numerical value of the sixth forward speed ratio is determined by the ring gear/sun gear tooth ratio of the planetary gearset 720.

The seventh forward speed ratio is established with the engagement of the torque-transmitting mechanisms 750, 752, 758, and 760. During the seventh forward speed ratio, the ring gear member 746 and planet carrier assembly member 726 are rotated at a speed determined by the speed of the sun gear member 742 and the ring gear/sun gear tooth ratio of the planetary gearset 740. The sun gear member 722 and therefore output shaft 19 are rotated at a speed determined by the speed of the ring gear member 724, the speed of the planet carrier assembly member 726, and the ring gear/sun gear tooth ratio of the planetary gearset 720. The numerical value of the seventh forward speed ratio is determined by the ring gear/sun gear tooth ratios of the planetary gearsets 720 and 740.

It should now be apparent that each of the family members has three planetary gearsets with each gear set having three members. The first member of each of the planetary gearsets are continuously interconnected. At least one member of one of the planetary gearsets is continuously interconnected with the output shaft. Six torque transmitting mechanisms are selectively engaged in combinations of four to establish at least seven forward speed ratios and one reverse ratio between the transmission input shaft and the transmission output shaft. At least two of the torque transmitting mechanisms are clutches each of which selectively interconnect the transmission input shaft with respective members of the planetary gearsets. Each of the single step forward interchanges are of the single transition type.

It should also be apparent that modifications and variations are possible to the family that are not depicted in the above-described embodiments. Therefore, the invention should only be limited by the appended claims.

What is claimed is:

1. A multi-speed transmission comprising:

an input shaft;

an output shaft;

a transmission housing;

a first planetary gearset having first, second, and third planetary members;

a second planetary gearset having first, second, and third planetary members;

a third planetary gearset having first, second, and third planetary members;

an interconnecting member for continuously interconnecting said first member of said first planetary gearset, said first member of said second planetary gearset, and said first member of said third planetary gearset; wherein:

said output shaft is continuously connected with said second member of said third planetary gearset, a first torque-transmitting mechanism selectively interconnecting said input shaft with said second member of said first planetary gearset, a second torque-transmitting mechanism selectively interconnecting said input shaft with said third member of said third planetary gearset, a third torque-transmitting mechanism selectively interconnecting said third member of said first planetary gearset with said second member of said second planetary gearset, a fourth torque-transmitting mechanism selectively interconnecting said third member of said second planetary gearset with said third member of said third planetary gearset, a fifth torque-transmitting mechanism selectively interconnecting said transmission housing with said third member of said first planetary gearset, and a sixth torque-transmitting mechanism selectively interconnecting said transmission housing with said third member of said second planetary gearset, or said output shaft is continuously connected with said second member of said third planetary gearset, said first torque-transmitting mechanism selectively interconnecting said input shaft with said second member of said first planetary gearset, said second torque-transmitting mechanism selectively interconnecting said input shaft with said third member of said third planetary gearset, said third torque-transmitting mechanism selectively interconnecting said third member of said first planetary gearset with said second member of said second planetary gearset, said fourth torque-transmitting mechanism selectively interconnecting said third member of said second planetary gearset with said third member of said third planetary gearset, said fifth torque-transmitting mechanism selectively interconnecting said transmission housing with said third member of said first planetary gearset, and said sixth torque-transmitting mechanism selectively interconnecting said transmission housing with said third member of said second planetary gearset, or said output shaft is continuously connected with said second member of said third planetary gearset, said first torque-transmitting mechanism selectively interconnecting said input shaft with said second member of said first planetary gearset, said second torque-transmitting mechanism selectively interconnecting said input shaft with said third member of said third planetary gearset, said third torque-transmitting mechanism selectively interconnecting said third member of said first planetary gearset with said second member of said second planetary gearset, said fourth torque-transmitting mechanism selectively interconnecting said second member of said second planetary gearset with said third member of said third planetary gearset, said fifth torque-transmitting mechanism selectively interconnecting said transmission housing with said third member of said first planetary gearset, and said sixth torque-transmitting mechanism selectively interconnecting said transmission housing with said third member of said second planetary gearset, or said output shaft is continuously connected with said second member of said third planetary gearset, said first torque-transmitting mechanism selectively interconnecting said input shaft with said second member of said first planetary gearset, said second torque-transmitting mechanism selectively interconnecting said input shaft with said third member of said third planetary gearset, said third torque-transmitting mechanism selectively interconnecting said third member of said first planetary gearset with said second member of said second planetary gearset, said fourth torque-transmitting mechanism selectively interconnecting said second member of said second planetary gearset with said third member of said third planetary gearset, said fifth torque-transmitting mechanism selectively interconnecting said transmission housing with said third member of said first planetary gearset, and said sixth torque-transmitting mechanism selectively interconnecting said transmission housing with said third member of said second planetary gearset, or said output shaft is continuously connected with said second member of said first planetary gearset, said first torque-transmitting mechanism selectively interconnecting said input shaft with said third member of said first planetary gearset, said second torque-transmitting mechanism selectively interconnecting said input shaft with said second member of said third planetary gearset, said third torque-transmitting mechanism selectively interconnecting said third member of said first planetary gearset with said second member of said second planetary gearset, said fourth torque-transmitting mechanism selectively interconnecting said third member of said second planetary gearset with said third member of said third planetary gearset, said fifth torque-transmitting mechanism selectively interconnecting said transmission housing with said second member of said second planetary gearset, and said sixth torque-transmitting mechanism selectively interconnecting said transmission housing with said third member of said third planetary gearset, or said output shaft is continuously connected with said second member of said second planetary gearset, said first torque-transmitting mechanism selectively interconnecting said input shaft with said third member of said first planetary gearset, said second torque-transmitting mechanism selectively interconnecting said input shaft with said second member of said third planetary gearset, said third torque-transmitting mechanism selectively interconnecting said third member of said first planetary gearset with said second member of said second planetary gearset, said fourth torque-transmitting mechanism selectively interconnecting said third member of said second planetary gearset with said third member of said third planetary gearset, said fifth torque-transmitting mechanism selectively interconnecting said transmission housing with said second member of said second planetary gearset, said sixth torque-transmitting mechanism selectively interconnecting said transmission housing with said third member of said third planetary gearset, or said output shaft is continuously connected with said second member of said second planetary gearset, said first torque-transmitting mechanism selectively interconnecting said input shaft with said second member of said first planetary gearset, said second torque-transmitting mechanism selectively interconnecting said input shaft with said third member of said second planetary gearset, said third torque-transmitting mechanism selectively interconnecting said third member of said first planetary gearset with said third member of said second planetary gearset, said fourth torque-transmitting mechanism selectively interconnecting said third member of said second planetary gearset with said second member of said third planetary gearset, said fifth torque-transmitting mechanism selectively interconnecting said transmission housing with said third member of said first planetary gearset, and said sixth torque-transmitting mechanism selectively interconnecting said transmission housing with said third member of said third planetary gearset, or said output shaft is continuously connected with said second member of said first planetary gearset, said first torque-transmitting mechanism selectively interconnecting said input shaft with said third member of said first planetary gearset, said second torque-transmitting mechanism selectively interconnecting said input shaft with said second member of said third planetary gearset, said third torque-transmitting mechanism selectively interconnecting said third member of said first planetary gearset with said second member of said second planetary gearset, said fourth torque-transmitting mechanism selectively interconnecting said second member of said second planetary gearset with said third member of said third planetary gearset, said fifth torque-transmitting mechanism selectively interconnecting said transmission housing with said third member of said second planetary gearset, and said sixth torque-transmitting mechanism selectively interconnecting said transmission housing with said third member of said third planetary gearset; and said six torque-transmitting mechanisms being selectively engaged in combinations of four to establish at least seven forward speed ratios and one reverse speed ratio in said planetary gearsets.

2. The multi-speed transmission defined in claim 1 further comprising:

said first members of said first, second, and third planetary gearsets being a member selected from a first group consisting of a sun gear member, a ring gear member, and a planet carrier assembly member;

said second members of said first, second, and third planetary gearsets being a member of a first group consisting of a sun gear member, a ring gear member, and a planet carrier assembly member not selected as said first member; and said third members of said first, second, and third planetary gearsets being a member of a first group consisting of a sun gear member, a ring gear member, and a planet carrier assembly member not selected as either said first member or said second member.

3. A multi-speed transmission comprises;

an input shaft;

an output shaft;

a transmission housing;

a first planetary gearset having a first member, a second member, and a third member;

a second planetary gearset having a first member, a second member, and a third member;

a third planetary gearset having a first member, a second member, and a third member;

an interconnecting member continuously interconnecting said first members of said planetary gearsets; wherein:

said output shaft being continuously interconnected with second member of said third planetary gearset, a first torque-transmitting mechanism selectively interconnecting said input shaft with said second member of said first planetary gearset, a second torque-transmitting mechanism selectively interconnecting said input shaft with said third member of said third planetary gearset, a third torque-transmitting mechanism selectively interconnecting said third member of said first planetary gearset with said second member of said second planetary gearset, a fourth torque-transmitting mechanism selectively interconnecting said transmission housing with said third member of said first planetary gearset, a fifth torque-transmitting mechanism selectively interconnecting said transmission housing with said third member of said second planetary gearset, and a sixth torque-transmitting mechanism selectively interconnecting said third member of said third planetary gearset with said third member of said second planetary gearset or said second member of said second planetary gearset, or said output shaft being continuously interconnected with said second member of said first planetary gearset, said first torque-transmitting mechanism selectively interconnecting said input shaft with said third member of said first planetary gearset, said second torque-transmitting mechanism selectively interconnecting said input shaft with said second member of said third planetary gearset, said third torque-transmitting mechanism selectively interconnecting said third member of said first planetary gearset with said second member of said second planetary gearset, said fourth torque-transmitting mechanism selectively interconnecting said transmission housing with said second member of said second planetary gearset or said third member of said second planetary gearset, said fifth torque-transmitting mechanism selectively interconnecting said transmission housing with said third member of said third planetary gearset, said sixth torque-transmitting mechanism selectively interconnecting said third member of said third planetary gearset with said third member of said second planetary gearset or with said second member of said second planetary gearset, or said output shaft being continuously interconnected with said second member of said second planetary gearset, said first torque-transmitting mechanism selectively interconnecting said input shaft with said second member of said first planetary gearset, said second torque-transmitting mechanism selectively interconnecting said input shaft with said third member of said second planetary gearset, said third torque-transmitting mechanism selectively interconnecting said third member of said first planetary gearset with said second member of said third planetary gearset, said fourth torque-transmitting mechanism selectively interconnecting said transmission housing with said third member of said first planetary gearset, said fifth torque-transmitting mechanism selectively interconnecting said transmission housing with said third member of said third planetary gearset, and said sixth torque-transmitting mechanism selectively interconnecting said third member of said second planetary gearset with said second member of said third planetary gearset; and said six selectively engageable torque transmitting mechanisms being selectively engageable in combinations of four to establish at least seven forward speed ratios and one reverse speed ratio between said input shaft and said output shaft.

4. The multi-speed transmission defined in claim 3 further comprising:

said first members of said first, second, and third planetary gearsets being a member selected from a first group consisting of a sun gear member, a ring gear member, and a planet carrier assembly member;

said second members of said first, second, and third planetary gearsets being a member of a first group consisting of a sun gear member, a ring gear member, and a planet carrier assembly member not selected as said first member; and said third members of said first, second, and third planetary gearsets being a member of a first group consisting of a sun gear member, a ring gear member, and a planet carrier assembly member not selected as either said first member or said second member.

* * * * *